United States Patent [19]
Koyanagi et al.

[11] Patent Number: 5,378,038
[45] Date of Patent: Jan. 3, 1995

[54] RESTRAINING PROTECTIVE FOLDABLE SEAT FOR INFANTS

[75] Inventors: Toshiro Koyanagi; Yayoi Hashimoto, both of Hikone; Haruyuki Takagi, Tokyo, all of Japan

[73] Assignee: Takada Corporation, Tokyo, Japan

[21] Appl. No.: 981,477

[22] Filed: Nov. 25, 1992

[30] Foreign Application Priority Data

Dec. 5, 1991 [JP] Japan ................... 3-22094

[51] Int. Cl.⁶ .................. A47C 1/08; B60R 22/00
[52] U.S. Cl. .................. 297/256.13; 297/367; 297/378.12; 297/378.14
[58] Field of Search ............. 297/250.1, 256.1, 256.13, 297/367, 378.12, 378.14

[56] References Cited

U.S. PATENT DOCUMENTS

| | | | |
|---|---|---|---|
| 3,404,917 | 10/1968 | Smith | 297/256.1 |
| 3,433,524 | 3/1969 | Close | 297/378.12 |
| 3,731,342 | 5/1973 | Cousin | 297/378.12 |
| 4,521,052 | 6/1985 | Cone | 297/250.1 |
| 4,762,364 | 8/1988 | Young | 297/256.13 |
| 5,121,965 | 6/1992 | Sköld et al. | 297/256.1 |

FOREIGN PATENT DOCUMENTS

| | | |
|---|---|---|
| 1186808 | 4/1970 | United Kingdom . |
| 2189690A | 11/1987 | United Kingdom . |
| 2220848A | 1/1990 | United Kingdom . |
| 2247165A | 2/1992 | United Kingdom . |

*Primary Examiner*—Alexander Grosz
*Attorney, Agent, or Firm*—Armstrong, Westerman, Hattori, McLeland & Naughton

[57] ABSTRACT

An infant-restraining protective seat (1) includes a seat portion (2) for seating an infant, a seat back (3) for supporting the back of the seated infant, and an infant seat belt device (5). The seat back (3) is tiltably attached to the seat portion (2) via a turning shaft (20) and the seat portion (2) and seat back (3) are foldable. Accordingly, when the infant-restraining protective seat (1) is not in use, the protective seat is folded up to reduce its size and can then be stored. The seat (1) can be carried about and set up on a vehicle seat much more easily. In addition, only a small amount of space is necessary for storage.

6 Claims, 24 Drawing Sheets

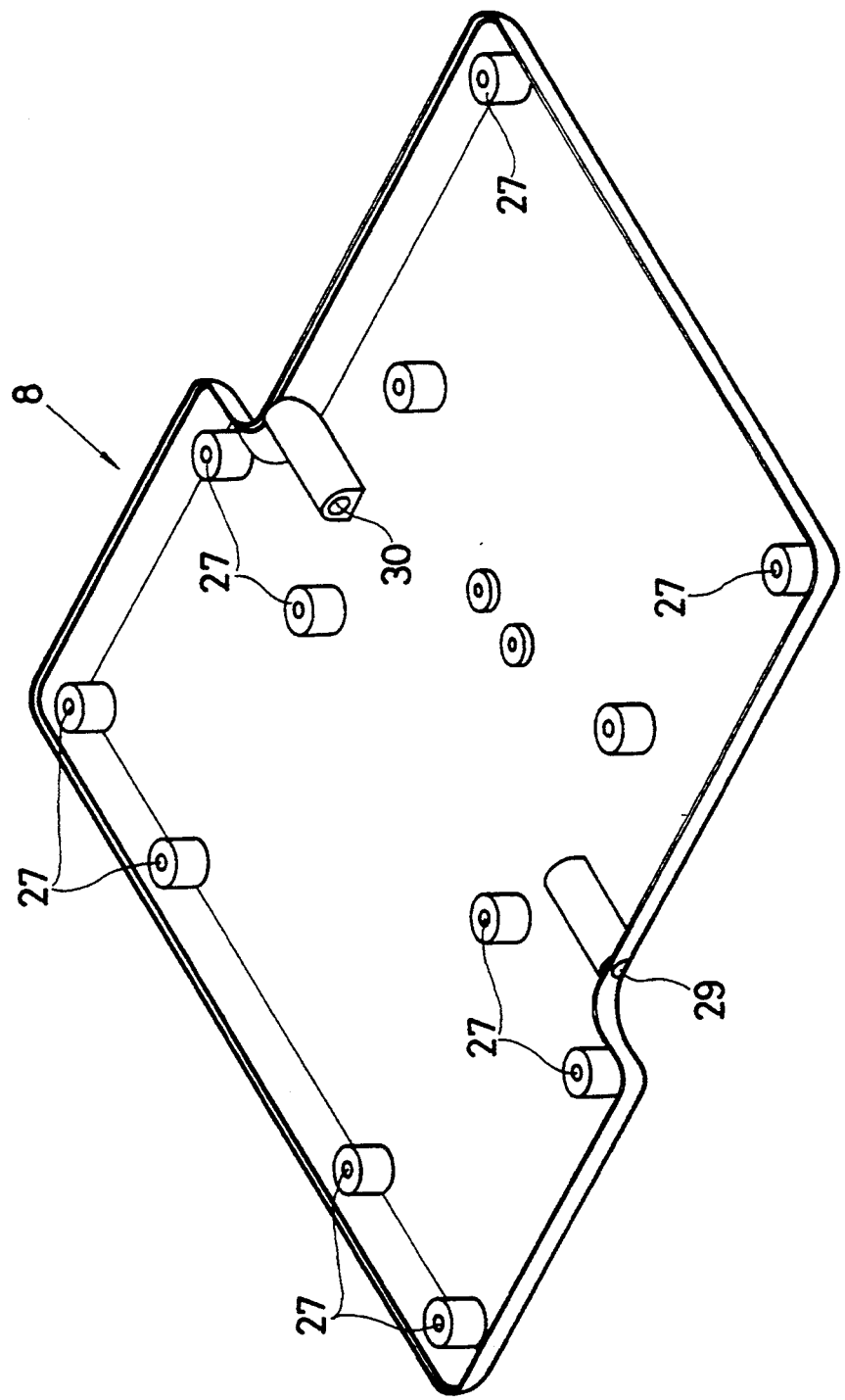

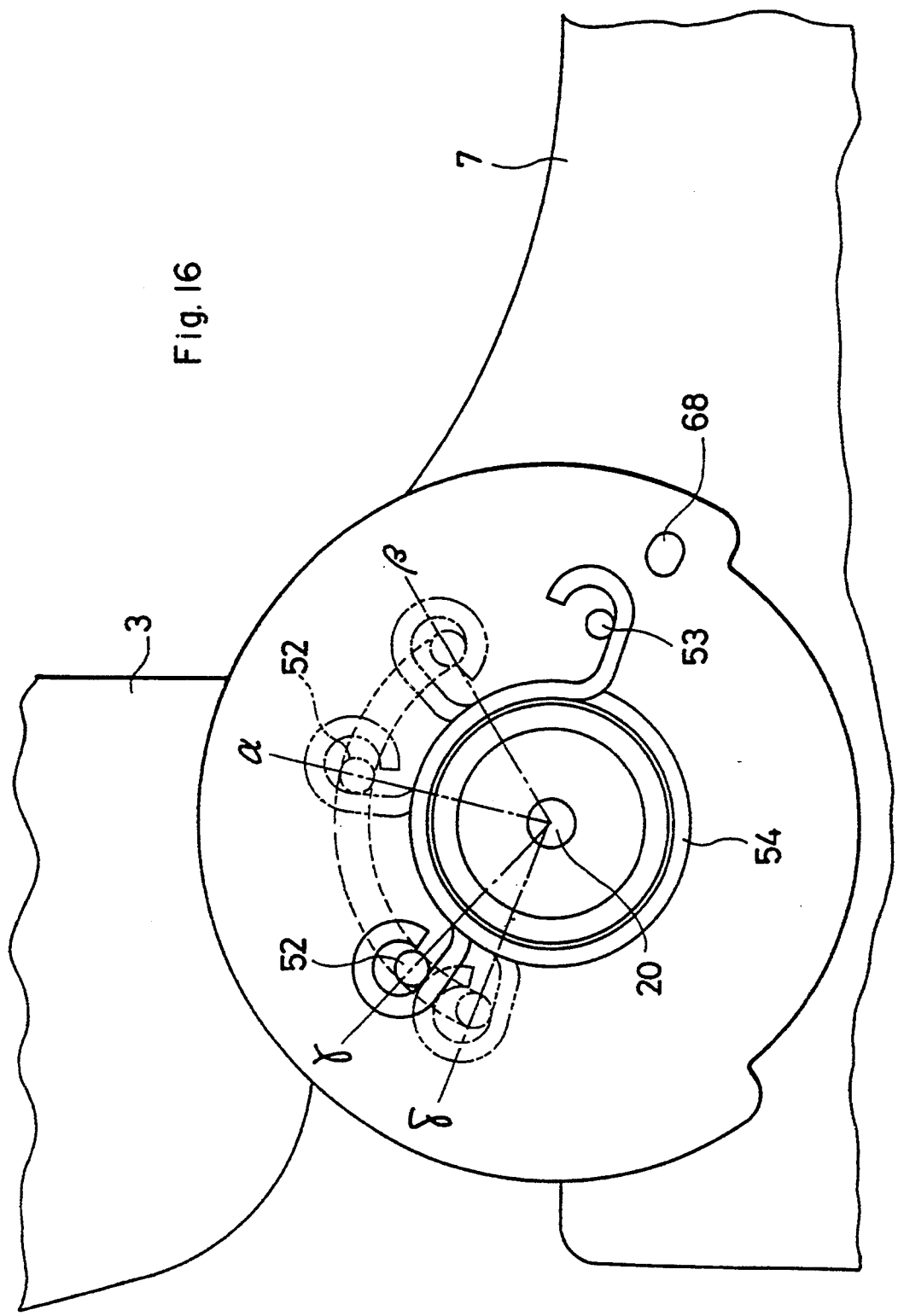

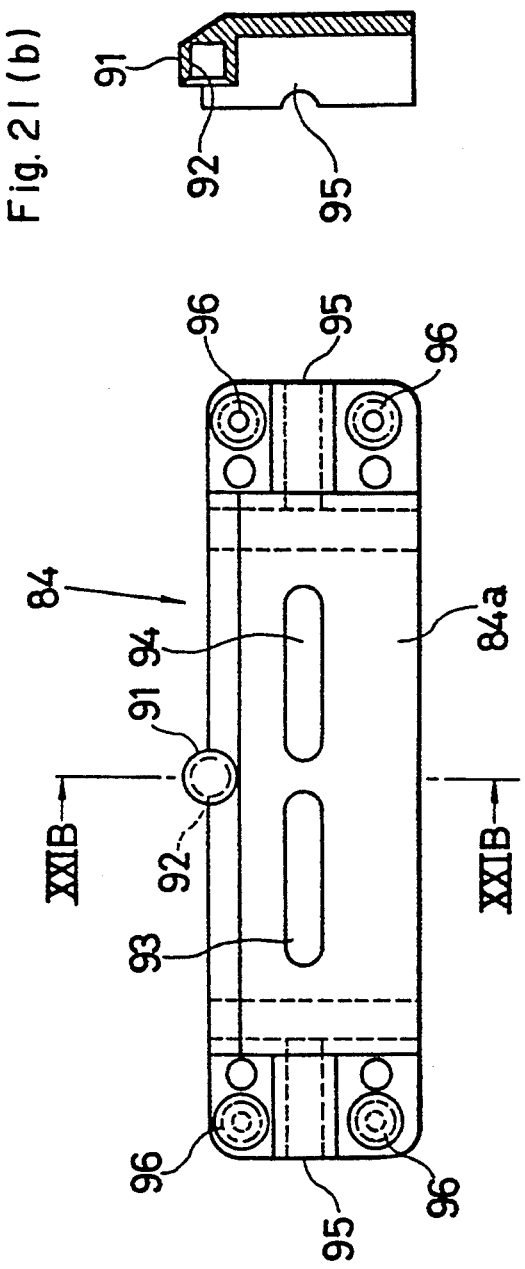

RESTRAINING PROTECTIVE FOLDABLE SEAT FOR INFANTS

BACKGROUND OF THE INVENTION

This invention relates to an infant-restraining protective seat of the type placed upon and secured to a seat in a vehicle such as an automobile or airplane and adapted to restrain and protect a seated infant by infant-restraining protecting means such as a seat belt device for infants.

In a vehicle such as an automobile or airplane, restraining protective seats for infants have been used in order to maintain the seated posture of an infant during travel and protect the infant from shock at the time of acceleration and deceleration. An infant restraining and protective seat of this kind has a reclinable seat main body reclinably attached to a base member and adapted to seat an infant, and an infant seat belt device for restraining the seated infant. The infant seat belt device has an infant seat belt, a chest-contact pad attached to the end of the infant seat belt, a tongue provided on the end of the chest-contact pad, and a buckle, provided on the seat main body, capable of holding the tongue in such a manner that the tongue can be freely engaged with and disengaged from the buckle. In a state in which the tongue is engaged with and locked by the buckle, the infant is restrained by the infant seat belt and chest-contact pad.

In the conventional infant-restraining protective seat of this kind, the seat portion for seating the infant and a seat back which supports the back of the seated infant are integrally molded from a resin or the like, and the resulting integrally molded article is reclinably attached to the base portion. Since the seat portion and the seat back are thus formed from an integrally molded article, the conventional infant-restraining protective seat inevitably is large in size.

However, the fact that the infant-restraining protective seat is large in size makes it very difficult to carry and to set up on the seat of the vehicle. In addition, since the protective seat requires a large storage space owing to its large size, it is difficult to keep the seat in storage. Storage space is a major problem especially in vehicles such as automobiles, in which the amount of available space is limited.

SUMMARY OF THE INVENTION

An object of the present invention is to provide an infant-restraining protective seat capable of being reduced in size when not in use so as to be made easy to carry and set up on the seat of a vehicle, such a seat also requiring little storage space.

According to the present invention in a first aspect thereof, the foregoing object is attained by providing an infant-restraining protective seat comprising a seat portion for seating an infant, a seat back for supporting the back of the seated infant, and infant restraining means such as an infant seat belt device for restraining and protecting the seated infant, characterized in that the seat back is tiltably attached to the seat portion, and the seat portion and seat back are adapted so as to be foldable.

In a second aspect of the present invention, the seat back has left and right sides respectively provided with left and right side walls, the distance between inner side faces of the left and right side walls being set in such a manner that at least part of the seat portion will be received between the left and right side walls when the seat portion and seat back are folded.

In a third aspect of the present invention, the infant-restraining protective seat further comprises folded-state locking means for locking the seat portion to the seat back in a folded position when the seat portion and the seat back are folded.

In a fourth aspect of the present invention, the infant-restraining protective seat further comprises reclined-state locking means for locking the seat back to the seat portion at a prescribed reclining position.

In a fifth aspect of the present invention, the infant-restraining protective seat further comprises reclined-state locking means for locking the seat back to the seat portion at a prescribed reclining position, wherein the folded-state locking means is constructed by the reclined-state locking means.

In the infant-restraining protective seat according to the first aspect of the invention constructed as set forth above, the seat portion for seating the infant and the seat back for supporting the back of the seated infant are capable of being folded. When the infant-restraining protective seat is not in use, the protective seat can be reduced in size by folding the seat portion and the seat back. Since the protective seat thus folded up into a small size is accommodated and stored in this condition, the protective seat can be carried about and set up on a seat much more easily. In addition, only a small amount of space is necessary for storage.

In the second aspect of the invention, the arrangement is such that at least part of the seat portion is received between the left and right side walls of the seat back when the seat portion and seat back are folded. When folded, therefore, the protective seat has a more compact configuration.

In the third aspect of the invention, the seat back is locked in the folded position when the seat portion and the seat back are folded. This makes the seat very easy to handle.

In the fourth aspect of the present invention, the seat back can be set at a prescribed reclining position relative to the seat portion so that the infant can be seated in a relaxed and comfortable condition.

In the fifth aspect of the present invention, the reclined-state locking means functions also as the folded-state locking means, and therefore folded-state locking means need not be provided separately. Accordingly, the number of component parts is reduced and construction is simplified.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 8 is a perspective view showing a base portion in this embodiment;

FIG. 16 is an explanatory view for describing the spring characteristic of a torsion spring in this embodiment;

FIG. 21 illustrates a pin cover of the seat-back tilting control device, in which (a) is a front view thereof and (b) a sectional view taken along line XXIB—XXIB in (a);

FIG. 22 is a view for describing the operation of the locking pin and cam plate in the seat-back tilting control device of this embodiment;

DESCRIPTION OF THE PREFERRED EMBODIMENT

An embodiment of the present invention will now be described with reference to the drawings.

Figure 1:
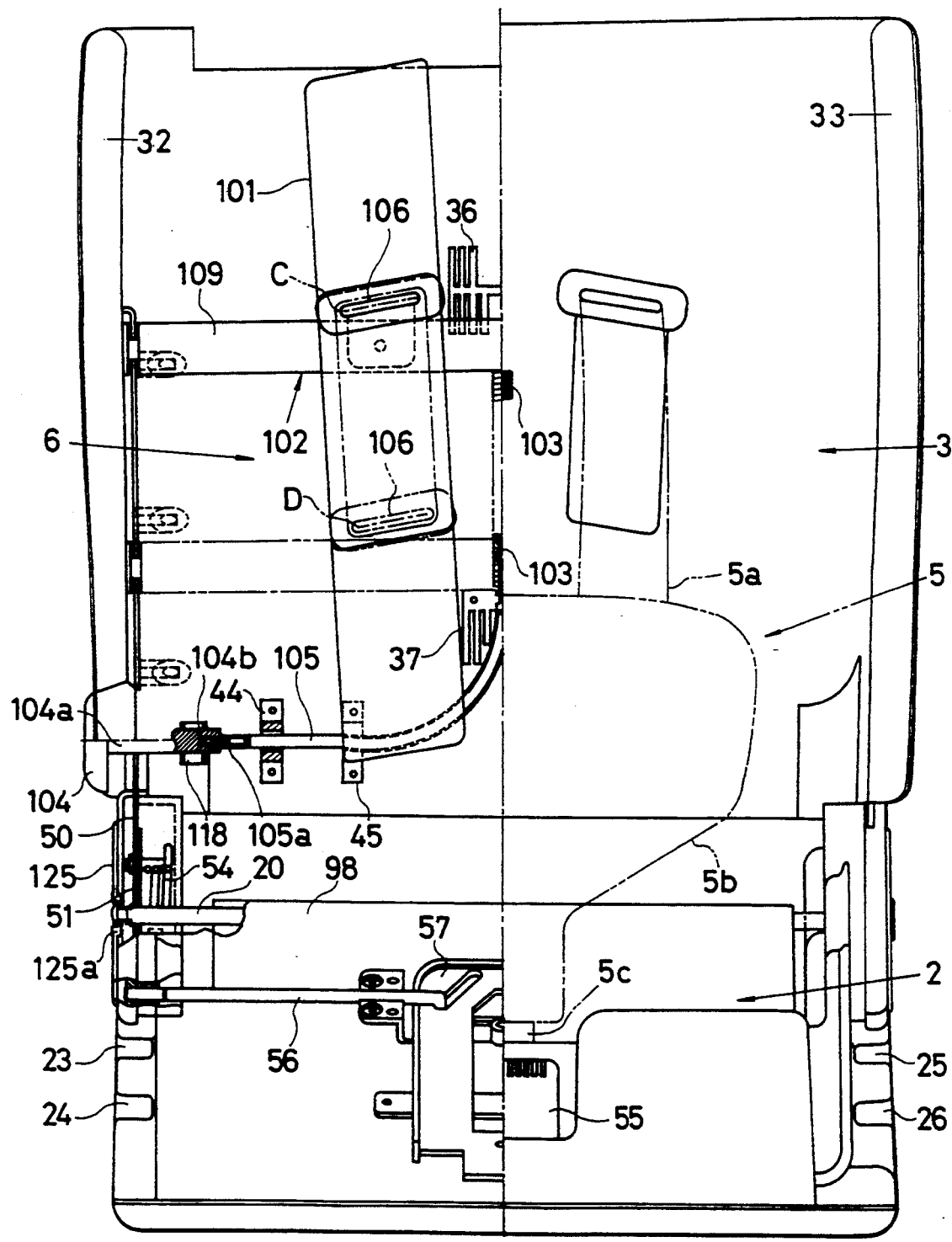
FIG. 1 is a front view showing an embodiment of an infant-restraining protective seat according to the present invention, in which the left half of the seat has been cut away.
Figure 2:
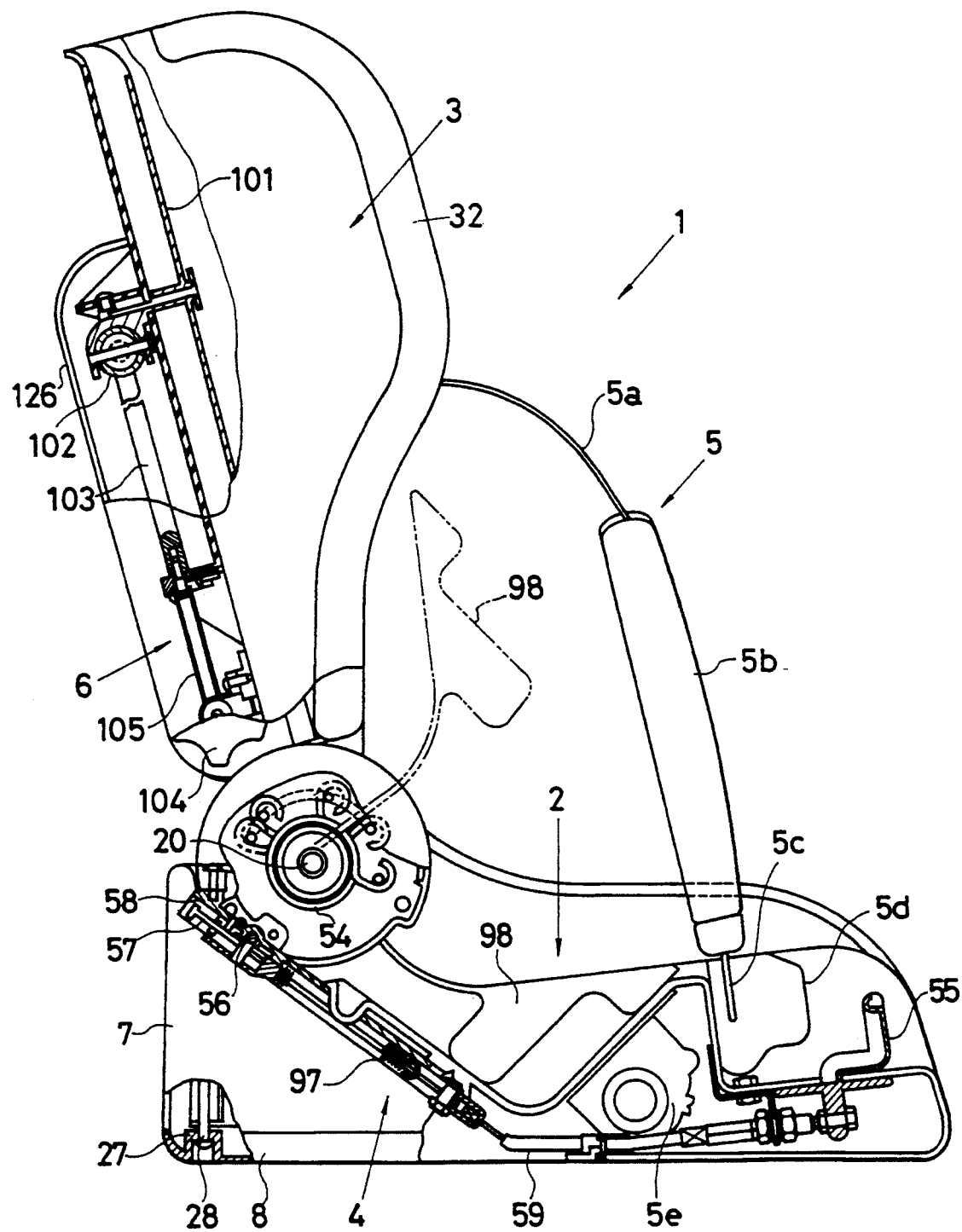
FIG. 2 is a side view showing this embodiment with a portion thereof cut away.
Figure 3:
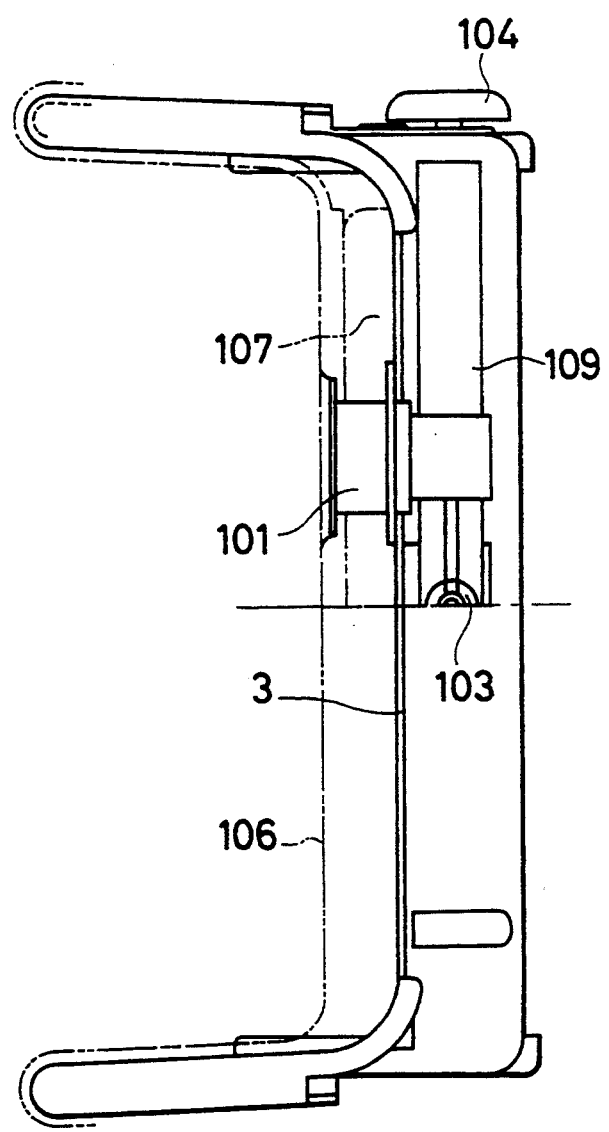
FIG. 3 is a plan view showing this embodiment with a portion thereof cut away.

As illustrated in FIGS. 1 through 3, an infant-restraining protective seat 1 according to the embodiment of this invention includes a seat portion 2 for seating an infant, a seat back 3 tiltably attached to the seat portion 2 for supporting the back of the infant, a seat-back tilting control device 4 for controlling tilting of the seat back 3, an infant seat belt device 5 for restraining the infant seated on the seat portion 2, and a shoulder-belt adjusting device 6 for adjusting the up-and-down position of a shoulder belt 5a in the infant seat belt device 5.

Figure 4:
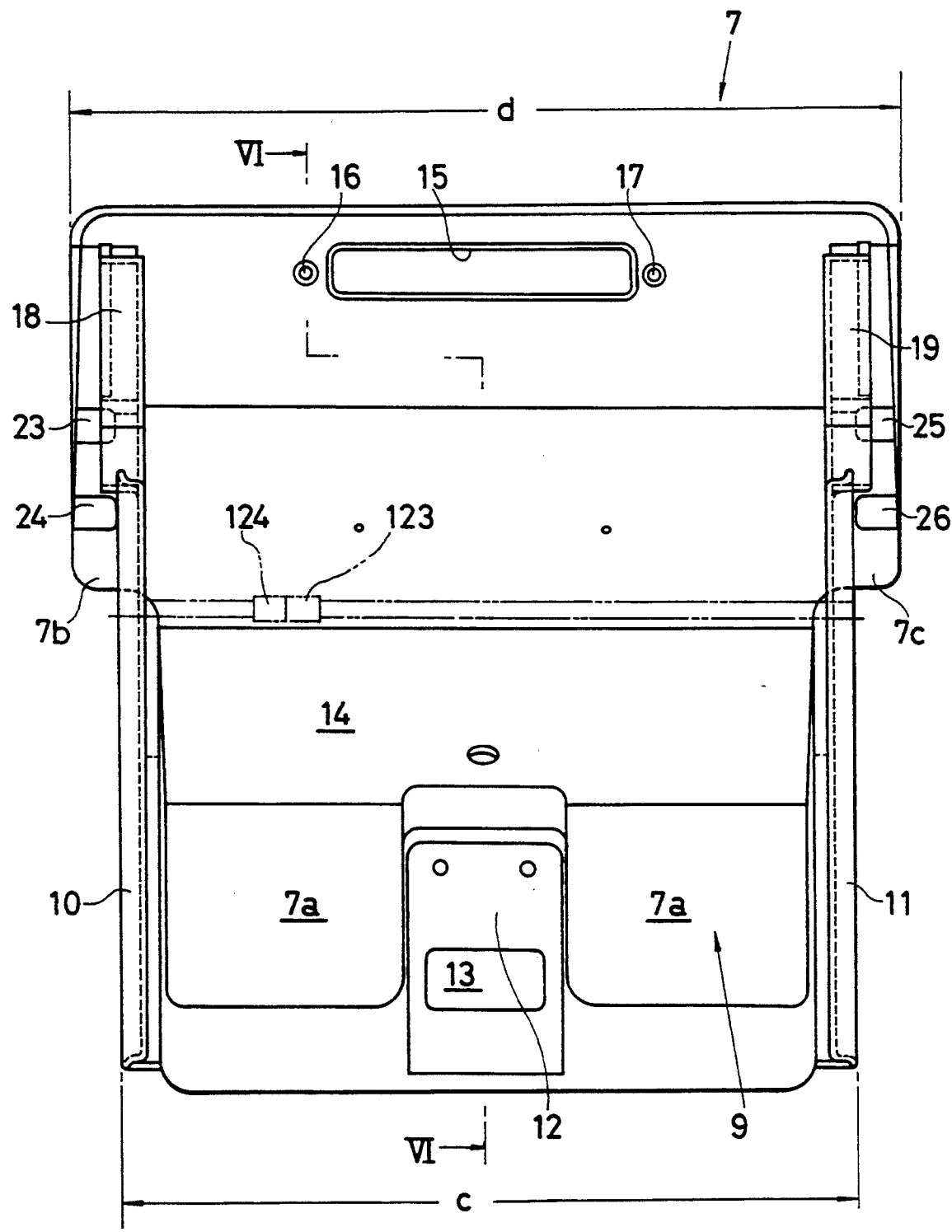
FIG. 4 is a plan view showing the main body of a seat portion in this embodiment.
Figure 5:
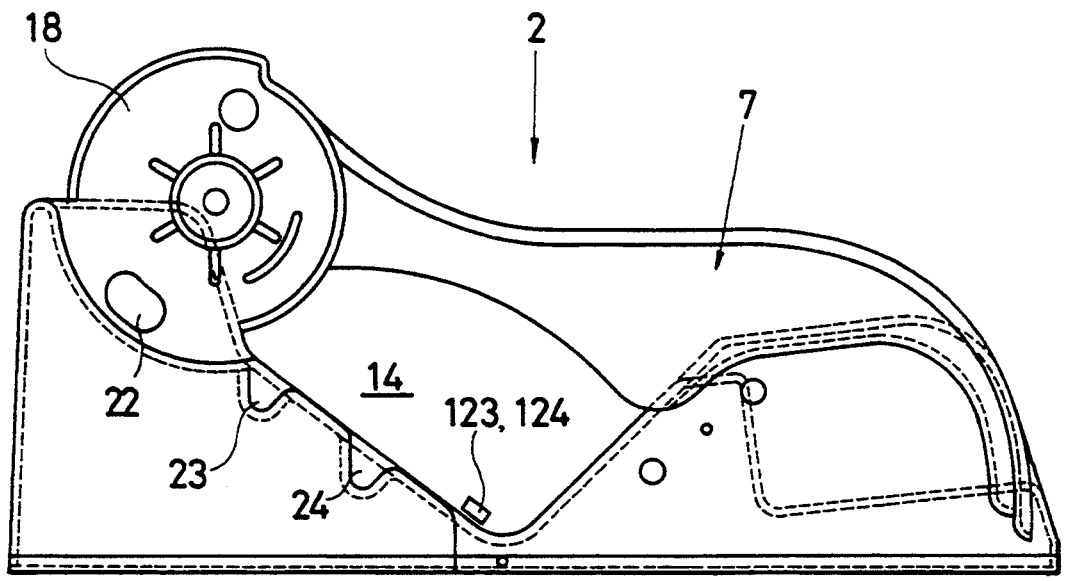
FIG. 5 is a side view showing the main body of the seat portion.
Figure 6:
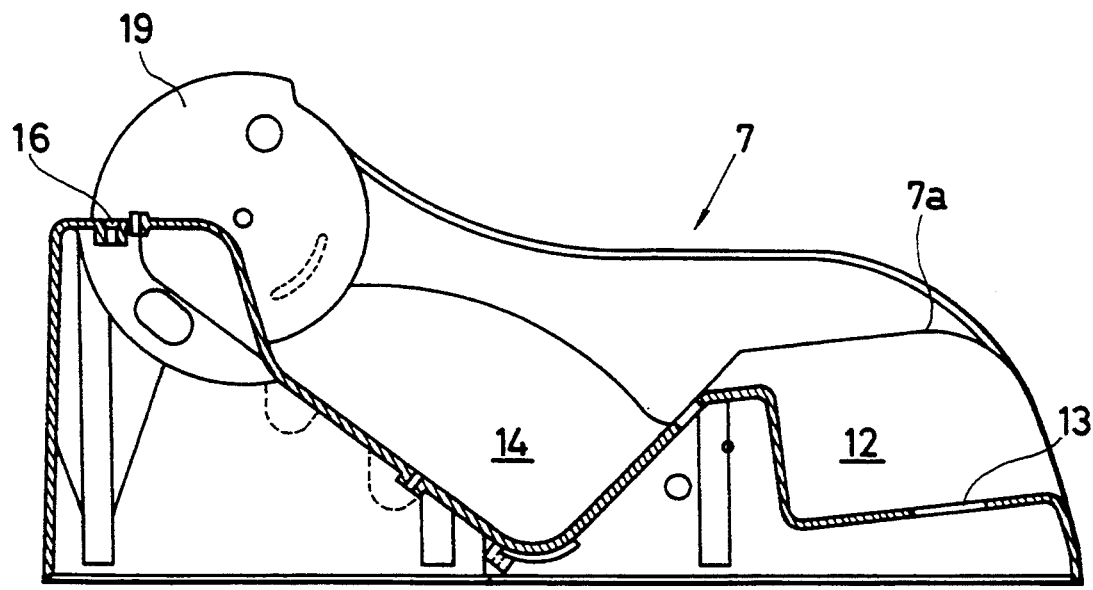
FIG. 6 is a sectional view of the main body of the seat portion taken along line VI—VI in FIG. 4.
Figure 7:
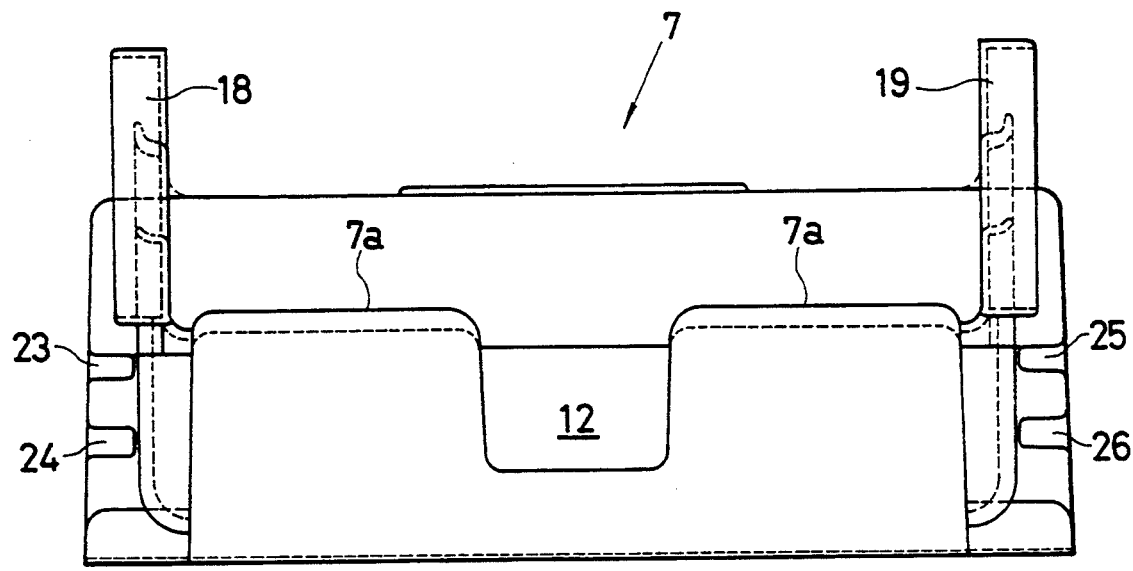
FIG. 7 is a front view showing the main body of a seat portion.

The seat portion 2 comprises a seat-portion body 7 and a base portion 8 supporting the seat-portion body 7. As illustrated in FIGS. 4 through 6, the seat-portion body 7 is constituted by a central portion 9 which directly seats the infant, and left and right side walls 10, 11 formed respectively on the left and right sides of the central portion 9. These components are formed as a unitary body consisting of a plastic shell. Formed in the forward part of the central portion 9 is a first recess 12 for accommodating a buckle 5d of the infant seat belt device 5, described later, and an operating lever 55 of the seat-back tilting control device 4, also described later. The first recess 12 is formed to have a guide hole 13 through which the operating lever 55 of the seat-back tilting control device 4 is passed. The guide hole 13 makes it possible for the operating lever 55 to be moved back and forth.

Formed across the middle of the central portion 9 in terms of the longitudinal direction thereof is a second recess 14 having a V-shaped cross section. As will be set forth later, the arrangement is such that a tongue 123 and buckle 124 of a passenger-restraining seat belt device installed at a vehicle seat 122 of a vehicle such as an automobile or airplane and used also for securing the infant-restraining protective seat 1 to the vehicle seat are situated within the second recess 14. Further, the rear part of the central portion 9 is provided with an infant seat-belt through-hole 15 through which the infant seat belt of the infant seat belt device 5 is passed, and with a pair of mounting screw holes 16, 17, which bracket the through-hole 15, through which screws for attaching a case 58 (the details of which will be described later) of the seat-back tilting control device 4 are passed.

The rear portions of the left and right side walls 10, 11 are formed to have respective turning support portions 18, 19, of substantially circular shape, at which turning portions of the control device 4 are supported. The turning support portions 18, 19 are provided at their centers with a turning-shaft through-hole 21 through which a turning shaft 20 for rotatably supporting the seat back 3 is passed, and at their rearward lower portions with a locking-pin through-hole 22 through which a locking pin 56 (the details of which will be described later) of the control device 4, which pin is for locking the seat back 3 at a set predetermined angular position, is passed.

The outer sides of the left and right side walls 10, 11 are formed to have pairs of grooves 23, 24; 25, 26; respectively, having upwardly open substantially V-shaped cross sections. These grooves are situated at positions corresponding to the second recess 14. In a case where the lateral width of the protective seat 1 for infants is considerably smaller than the width of the vehicle seat to which the protective seat 1 is secured, a pair of projecting portions 120c, 120d of a belt guide 101 (the details of which will be described later) which guides the seat belt installed at the vehicle seat are supported by these grooves 23, 24, 25, 26 when the belt guide is used.

As illustrated in FIG. 8, the base portion 8 also is formed of a plastic shell and is formed to have a prescribed number of mounting holes 27 into which screws for attaching the seat-portion body are tightly screwed. As shown in FIG. 2, the seat-portion body 7 is attached to a mounting portion 27 on the base portion 8 by means of screws 28. The left and right sides of the base portion 8 are provided with respective belt-guide through-holes 29, 30 through which the aforesaid belt guide is passed.

Figure 11:
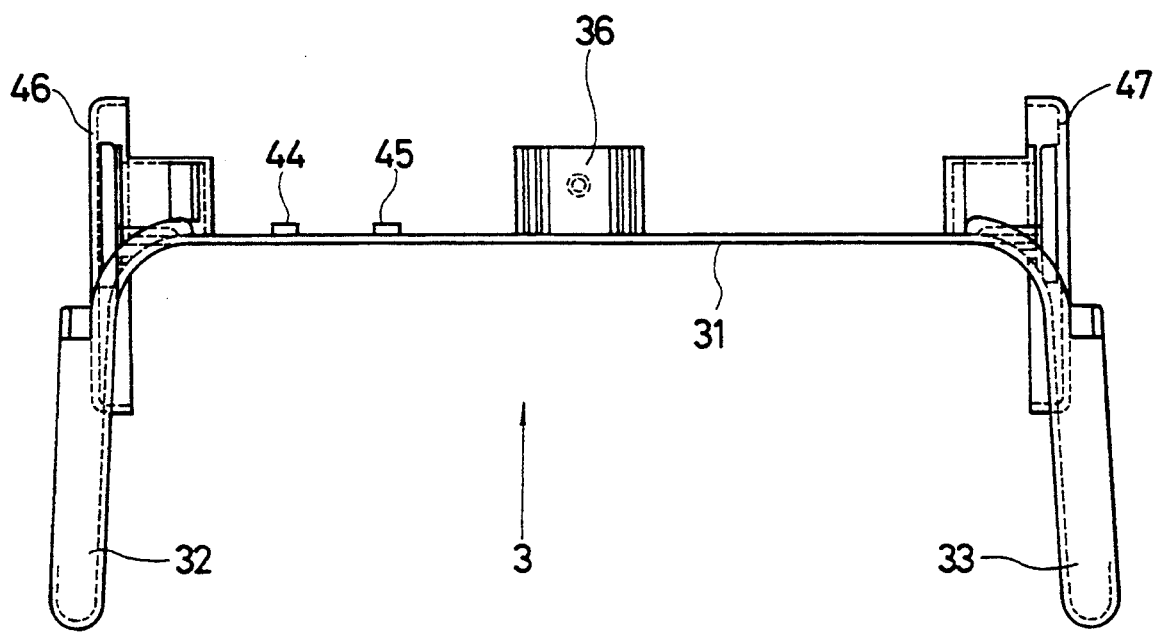
FIG. 11 is a plan view of the seat back.
Figure 9:
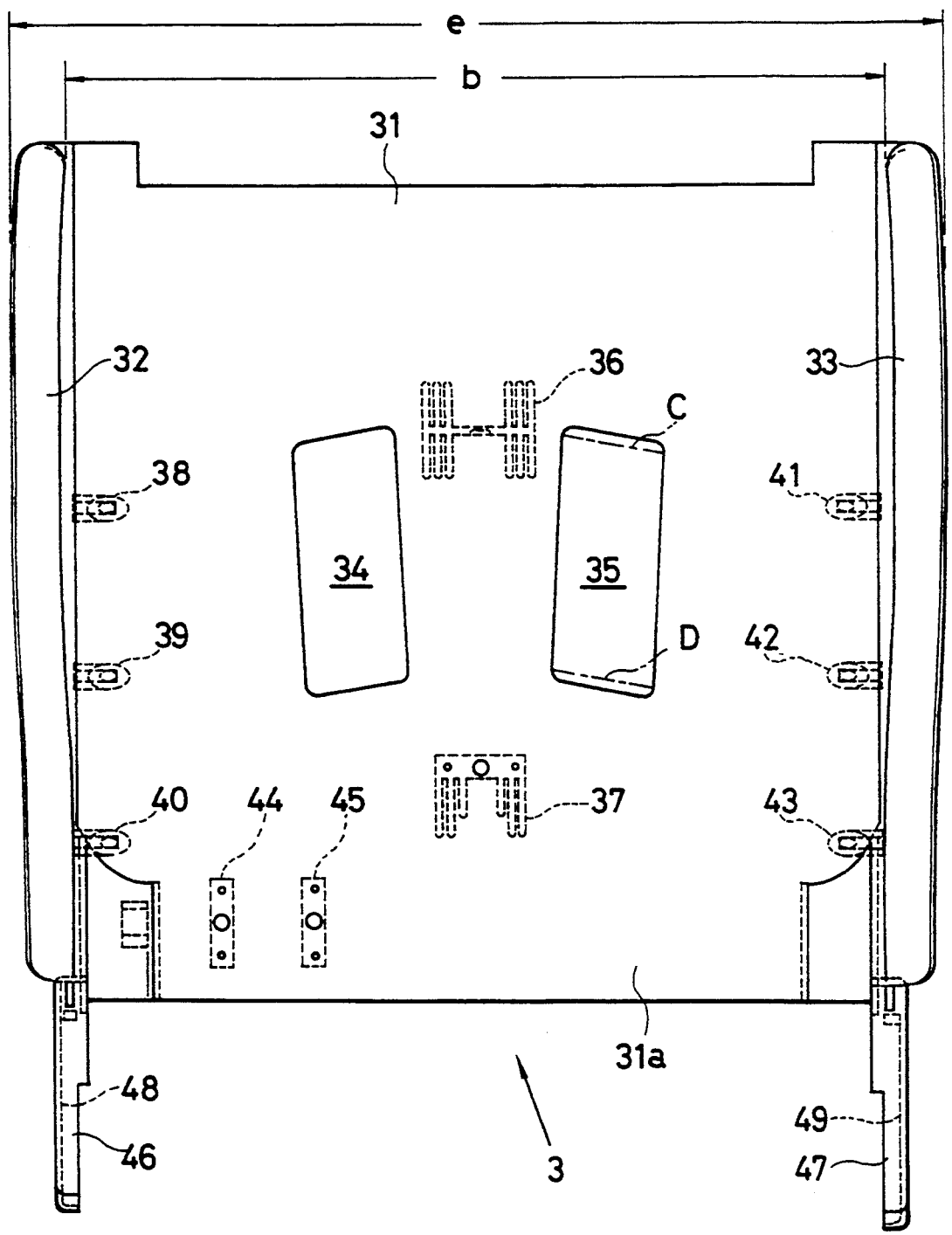
FIG. 9 is a front view showing a seat back in this embodiment.
Figure 10:
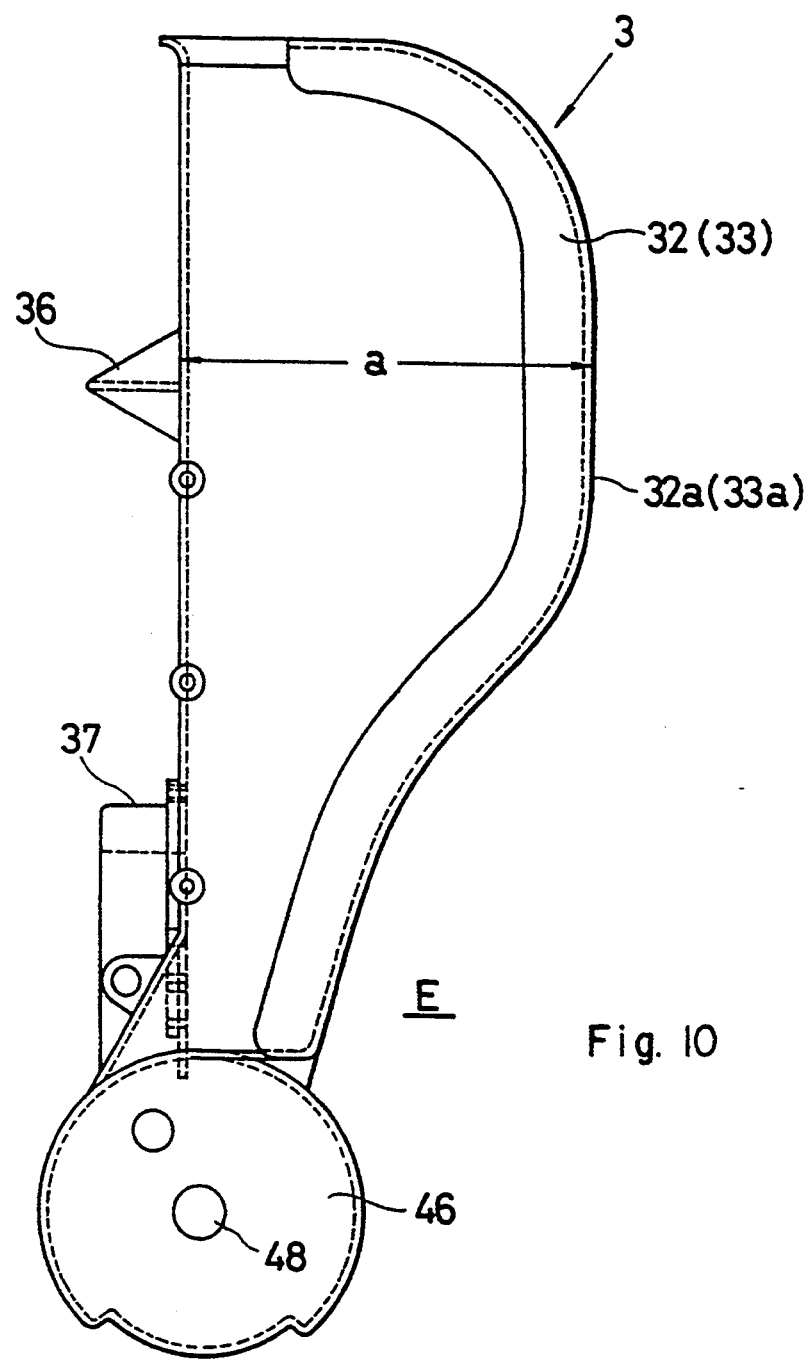
FIG. 10 is a side view of the seat back.

As shown in FIGS. 9 through 11, the seat back 3 is constituted by a seat back portion 31 which directly supports the back of the seated infant, and left and right side walls 32, 33 provided respectively on the right and left sides of the seat back portion 31. These also consist of a plastic shell. The central portion of the seat back 31 is provided with a pair of vertically extending guide holes 34, 35 each having the shape of parallelogram. A cylindrical portion 107 of a guide constituting the belt guide 101 (the details of which will be described later) in the shoulder-belt adjusting device 6 is passed through the guide holes 34, 35. The arrangement is such that the belt guide 101 may be moved up and down while being guided in the guide holes 34, 35.

The back side of the seat back portion 31 on the side of the seat back 3 opposite that which supports the infant is integrally provided with a pair of brackets 36, 37, one above the other, which freely rotatably support a screw rod 103 (shown in FIGS. 1 and 2) in the shoulder-belt adjusting device 6. Furthermore, the left and right side walls 32 and 33 at portions near the seat back portion 31 are provided respectively with mounting portions 38, 39, 40 and 41, 42, 43 into which screws for attaching an upper bracket 50 (the details of which will be described later) of the seat-back tilting control device 4 are tightly screwed. Further, the back side of the seat back portion 31 is provided with brackets 44, 45 which laterally support a torque link 105 (illustrated in FIGS. 1 and 2) in the shoulder-belt adjusting device 6.

The lower ends of the left and right side walls 32, 33 are formed to have respective turning support portions 46, 47, of substantially circular shape, in which turning portions of the seat-back control device 4 are accommodated and supported. The turning support portions 46, 47 are centrally provided with respective through-holes 48, 49 into each of which a projecting portion 125a on the central portion of a rotating shaft cover 125 (shown in FIG. 1), described later, is inserted.

Figure 12:
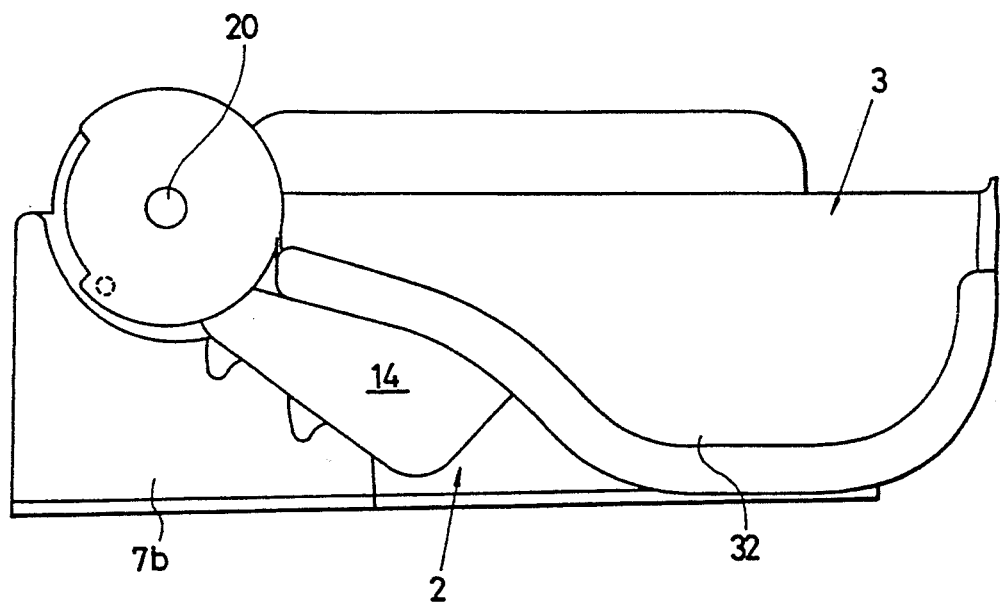
FIG. 12 is a side view schematically showing the protective seat of the embodiment in the folded state.

As shown in FIG. 10, the left and right side walls 32, 33 of the seat back 3 have a width a the upper part of which is comparatively large. The size of the width is so set that the back side of the seat back 3 will be substantially parallel to the lower surface of the base portion 8 when edges 32a, 32b on the upper portions of the left and right side walls 32, 33 each contact the upper surface of the base portion 8 at such time that the seat back 3 is folded, as illustrated in FIG. 12.

Figure 13:
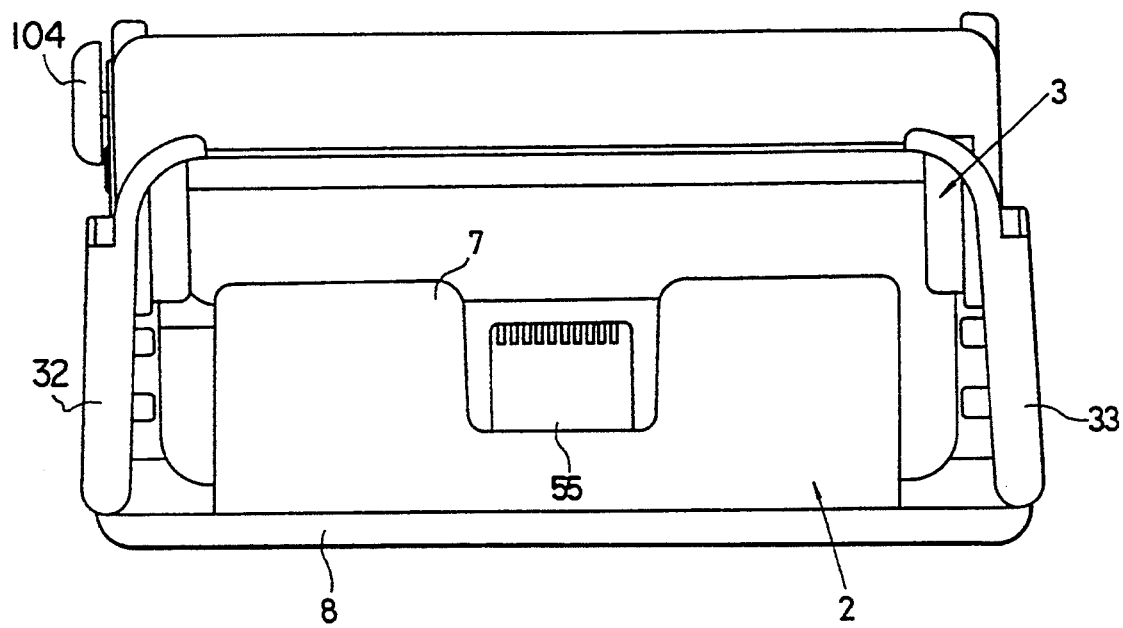
FIG. 13 is a front view schematically showing the protective seat of the embodiment in the folded state.

The distance b (shown in FIG. 9 and 11) between the opposing inner sides of the left and right side walls 32, 33 of seat back 3 is designed to be larger than the width c (shown in FIG. 4) of the forward part of the seat-portion body 7 but smaller than the width d (shown in FIG. 4) of the rear part of seat-portion body 7. Accordingly, when the seat back 3 is folded, as depicted in FIG. 13, the forward part of the seat-portion body 7 is received between the inner sides of the left and right side walls 32, 33 of the seat back 3. As a result, the infant-restraining protective seat 1 becomes small and compact when folded.

The left and right side edges at the rear part of the seat-portion body 7 assume positions at which they are substantially flush with the left and right side walls 32, 33. More specifically, even though the distance b between the opposing inner sides of the left and right side walls 32, 33 is designed to be smaller than the width d of the rear part of seat-portion main body 7, left and right side edges 7b, 7c at the rear part of the seat-portion body 7 are situated in a space E (shown in FIG. 10) formed by the narrow portions of rectangular portion 50a and a lower circular portion 50b. The rectangular portion 50a is provided with three vertically aligned screw holes 60, 61, 62 through which screws for attaching the upper bracket 50 to the seat back are passed. Further, the rectangular portion 50a is provided with a through-hole 63 through which a turning shaft 104a of an operating knob 104 (shown in FIG. 1) of the shoulder-belt adjusting device 6 is passed so as to be capable of turning.

The circular portion 50b is provided with a hole 64 through which the turning shaft 20 is passed so as to be capable of turning relative the circular portion. Further, in order that the seat back 3 may be locked at any of three reclining angles, three locking holes 65, 66, 67 through which the locking pin 56 is passed are formed in the circular portion 50b on the circumference of a circle of a prescribed radius from the center of the hole 64. In order to lock the seat back 3 at the folded position, the circular portion 50b is provided with a locking hole 68, located on the same circumference as the locking holes 65, 66, 67, through which the locking pin 56 is passed. As shown in (b) of FIG. 14, each of the locking holes 65, 66, 67, 68 is elliptical in form, with the ellipse having a minor axis f and a major axis g. In this case, the minor axis f is set to have a size that allows the locking pin 56 to be passed through and slid along the hole with almost no gap between the pin 56 and the walls of the hole. the left and right side walls 32, 33. Therefore, when the seat back 3 is folded, the left and right side edges 7b, 7c at the rear part of the seat-portion body 7 and the left and right side walls 32, 33 are capable of assuming positions where they are substantially flush.

As illustrated in FIGS. 1 and 2, the seat-back tilting control device 4 includes left and right upper brackets 50 attached respectively to the left and right side walls 32, 33, left and right lower brackets 51 attached respectively to the left and right side walls 10, 11 of the seat-portion body 7, a torsion spring 54 interposed between an upper hook pin 52 attached to the upper bracket 50 and a lower hook pin 53 attached to the lower bracket 51, an operating lever 55, the locking pin 56, a cam plate 57 for controlling movement of the locking pin 56 between a locking position and an unlocking position, a case 58 for slidably accommodating and supporting the locking pin 56 and the cam plate 57, a biasing spring 97 for constantly biasing the cam plate 57 in such a direction that the locking pin 56 assumes the locking position, and an operating-force transmitting link 59 connected between the operating lever 55 and the cam plate 57 for transmitting the operating force of the operating lever 55 to the cam plate 57 against the biasing force of the biasing spring 97.

Figures 14A, 14B:
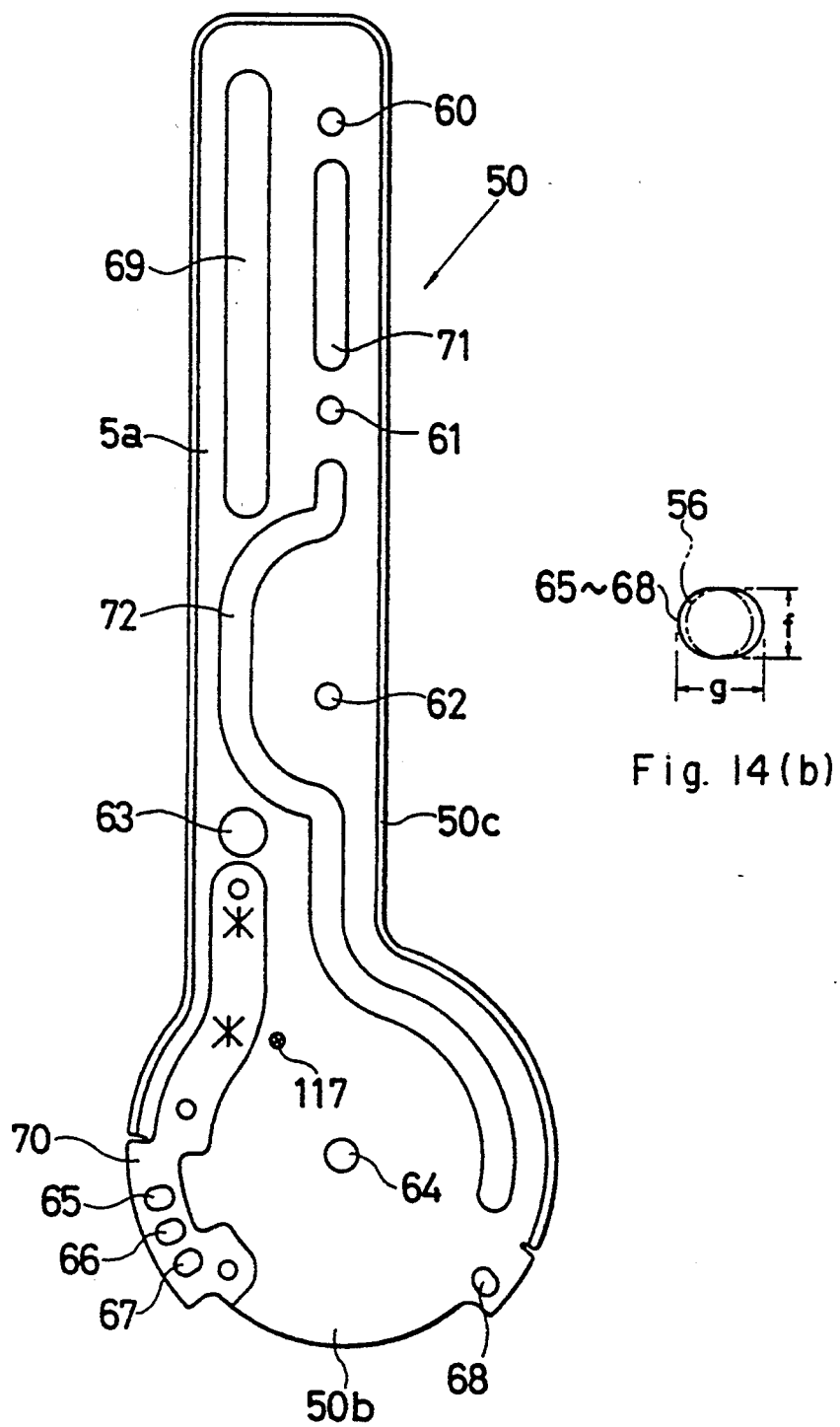
FIG. 14 illustrates an upper bracket in this embodiment, in which (a) a plan view thereof and (b) an enlarged view of a locking hole.

As illustrated in FIG. 14, the upper bracket 50 has the shape of a flat plate and is constituted by an upper Further, the locking holes 65, 66, 67, 68 are so arranged that the minor axis f of each hole lies in the circumferential direction of a circle concentric with the hole 64 while the major axis S of each hole lies in the diametric direction of the circle concentric with the hole 64. The circular portion 50 is further provided with a longitudinally extending guide slot 69. When guides 113, 114 of supporting means 102 (shown in FIG. 26) supporting the belt guide 101 move up and down, screw portions 113$b$, 114$b$ of the respective guides 113, 114 are guided by the guide slot 69. The circular portion 50$b$ is further provided with a hole 117 through which the upper hook pin 52 is passed and secured.

The portion in which the locking holes 65, 66, 67 for locking the seat back 3 at a prescribed reclining angle are formed is reinforced by a reinforcing member 70. The upper bracket 50 is formed to have a flange 50$c$ along the edge of parts of the rectangular portion 50$a$ and circular portion 50$b$. The rectangular portion 50$a$ and circular portion 50$b$ are formed to have reinforcing ribs 71, 72 by bending. The upper bracket 50 is reinforced by the reinforcing ribs 71, 72.

As illustrated in FIG. 1, the upper bracket 50 is secured to the seat back 3 by passing screws through the screw holes 60, 61, 62 and screwing them into the mounting holes 38, 39, 40 of the seat back 3. With each lapper bracket 50 thus secured to the seat back 3, play in the lateral direction is prevented.

Figure 15A:
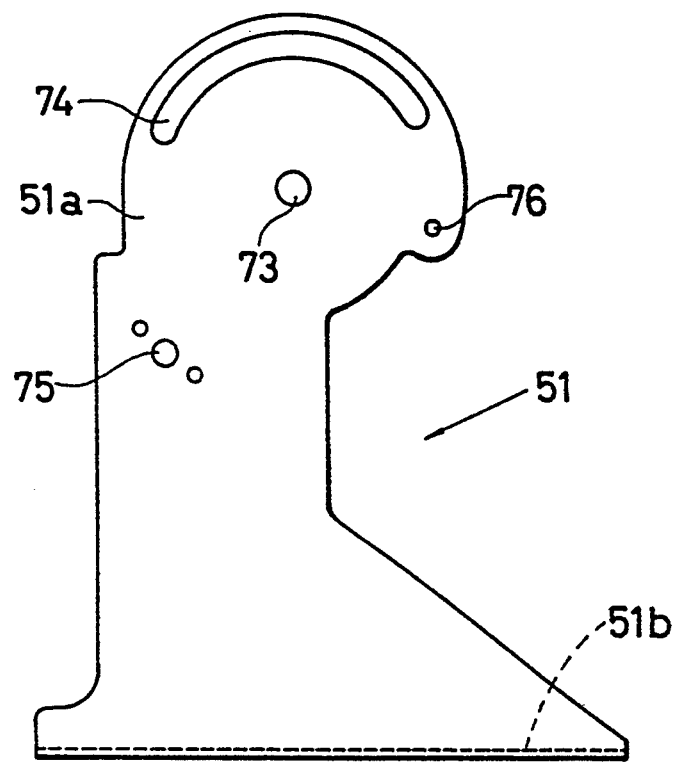
FIG. 15 illustrates a lower bracket in this embodiment, in which (a) is a front view thereof and (b) a plan view.
Figure 15B:
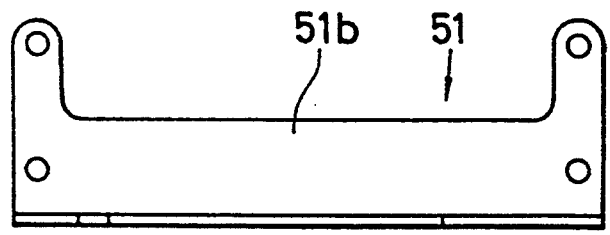

AS shown in (a) and (b) of FIG. 15, the lower bracket 51 is formed to have a semicircular portion 51$a$ on its upper part, while its lower part is formed to have a mounting portion 51$b$ fastened to the seat-portion body 7 by screws. The semicircular portion 51$a$ has a centrally provided circular hole 73 through which the turning shaft 20 is passed. The semicircular portion 51$a$ is further provided with a guide slot 74 along an arc concentric with the hole 73. The upper hook pin 52 is passed through the guide slot 74 and is turnably guided thereby when the seat back 3 is tilted. The lower bracket 51 includes also a hole 75 through which the locking pin 56 is slidably passed, and a hole 76 through which the lower hook pin 53 is passed and secured. In this case, the through-hole 75 is provided at such a position that the length of a line between the center of the hole 75 and the center of the hole 73 will be equal to the radius of the circle, which is centered on the hole 64, on which the locking holes 65, 66, 67 of upper bracket 50 are provided. The upper bracket 50 is secured to the seat-portion body 7 by screws (not shown).

As illustrated in FIG. 1, the turning shaft 20 is passed through the hole 73 of the lower bracket 51, which is secured to the seat-portion body 7, and is supported on the lower bracket 51, and the upper bracket 50 secured to the seat back 3 is situated on the outer side of the lower bracket 51 and is tiltably supported by passing the turning shaft 20 through the hole 64. In this case, the upper bracket 50 is prevented from falling off the turning shaft 20 by a retaining ring 77. A cover 78 of the turning shaft 20 is attached so as to cover the turning shaft 20 by fitting a projection 78$a$ of the cover 78 into the through-hole 48 of the seat back 3 and screwing a screw into the end portion of the turning shaft 20. The upper hook pin 52 secured to the upper bracket 50 is passed through the guide slot 74 so as to extend to inner side of the lower bracket 51 and is situated between the turning support portions 18, 19 of the seat-portion body 7. In addition, the torsion spring 54 is interposed between the upper hook pin 52 and the lower hook pin 53 secured to the lower bracket 51. Thus, the seat back 3 is attached to the seat-portion body 7 so as to be capable of tilting about the turning shaft 20.

In this case, one of the locking holes 65, 66, 67, 68 of the upper bracket 50 registers with the through-hole 75 of the lower bracket 51 depending upon the angular position to which the seat back 3 has been tilted. The torsion spring 54 is designed so as to have the following spring characteristic: Specifically, the torsion spring 54 is designed so to assume a free state when the upper hook pin 52 (namely one end of the torsion spring 54) is at a position $\alpha$ in FIG. 16. At this position, therefore, the spring force which the torsion spring 54 applies to the seat back 3 is zero. Further, the torsion spring 54 is so designed that when the seat-portion body 7 is made horizontal with the upper hook pin 52 at position $\alpha$, the seat back 3 will tilt forwardly under its own weight, i.e., in the direction of a folded-state locking position $\delta$. Owing to the forward tilting motion of the seat back 3 under its own weight, the spring force of the torsion spring 54 gradually increases so that the shock of this forward tilting motion of the seat back 3 is mitigated by this spring force.

On the other hand, when the seat back 3 is tilted toward the rear from the $\alpha$ position in order to be set at a desired reclining position, the spring force of the torsion spring 54 acts upon the seat back 3 in a direction returning it to the $\alpha$ position, and the spring force grows in conformity with the rearward tilting of the seat back 3. Accordingly, with the locking pin 56 inserted into any one of the locking holes 65, 66, 67 to set the seat back 3 at a prescribed reclining angle, the spring force of the torsion spring 54 that restores the upper hook pin 52 to the $\alpha$ position becomes comparatively large. As a result of this spring force, the seat back 3 is biased in such a manner that the edge of the particular one of the locking holes 65, 66, 67 on the minor-axis side thereof comes into abutting contact with the locking pin 56 at all times. As a result, angular play of the seat back 3 in the back-and-forth direction in which the seat back is tilted is prevented.

Further, when reclining of the seat back 3 attempts to be set in a half-latched state in which the locking pin 56 is not completely inserted into any of the locking holes 65, 66, 67, the seat back 3 is tilted in the forward direction by the enlarged spring force of the torsion spring 54. Accordingly, half-latching of the seat back 3 when reclining of the seat back is being set is prevented in reliable fashion.

Thus, the torsion spring 54 is designed so as to have a shock-absorber function which mitigates the shock due to forward tilting motion of the seat back 3 under its own weight, a play-preventing function for preventing play when the seat back 3 is reclined, and a half-latching preventing function for preventing half-latching of the seat back 3 when reclining of the latter is set.

Figures 17A, 17B:
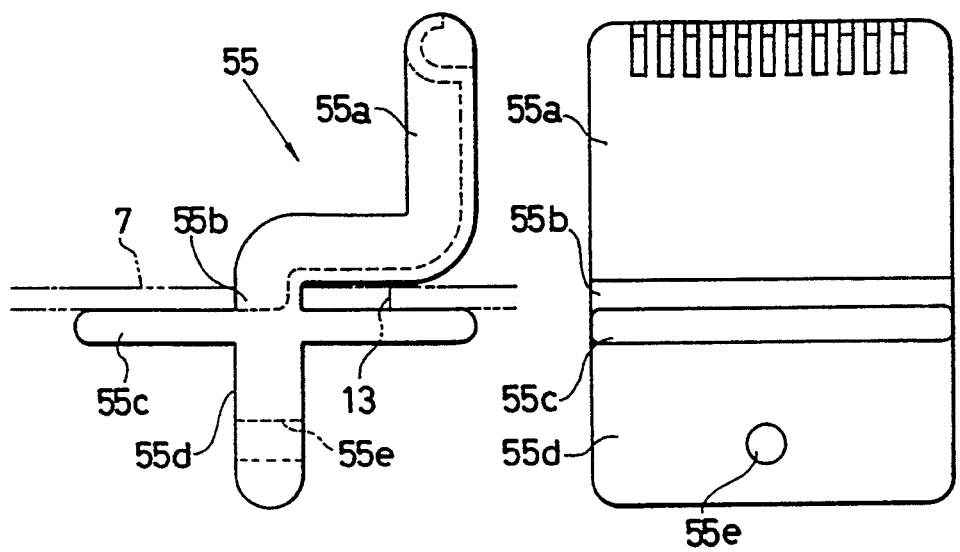
FIG. 17 illustrates an operating lever of a seat-back tilting control device in this embodiment, in which (a) is a side view thereof and (b) a front view.

As shown in FIG. 17, the operating lever 55 includes an operating portion 55$a$ arranged in the recess 12 of the seat-portion body 7 for actuating the operating lever 55, a penetration portion 55b which is passed through the guide hole 13, a support portion 55c for slidably supporting the operating lever 55 on the seat-portion body 7, and a connection portion 55d to which the operating-force transmitting link 59 is connected. The connecting portion 55d is provided with a hole 55e for fixing the link 59 that has been passed through the hole 55e.

Figure 18:
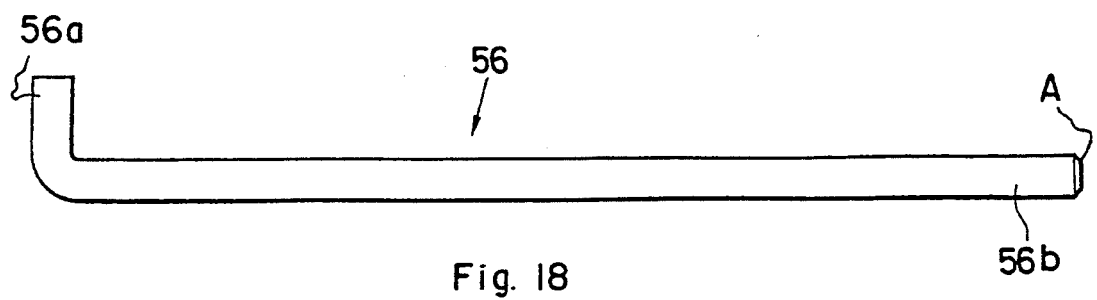
FIG. 18 is a view showing a locking pin in this embodiment.
Figure 19A:
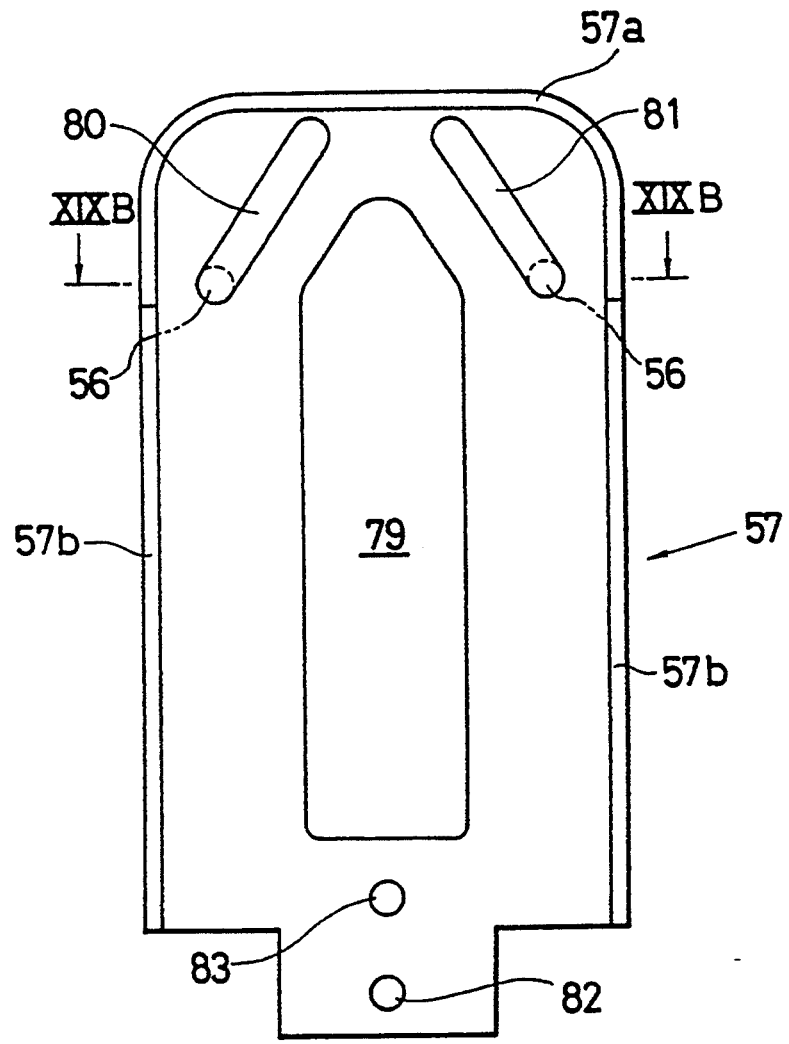
FIG. 19 illustrates a cam plate of the seat-back tilting control device in this embodiment, in which (a) is a plan view thereof and (b), a sectional view taken along line XIXB—XIXB in (a)

As shown in FIG. 18, the locking pin 56 is formed from a round bar, one end of which is formed to have a cam follower 56a bent at a right angle. The cam follower 56a is fitted into cam slots 80, 81 (shown in FIG. 19) of the cam plate 57 and is moved by movement of the cam plate 57 while being guided by the cam slots 80, 81. The other end of the locking pin 56 is formed to have a locking portion 56b. Owing to movement of the locking pin 56 while it is being guided by the cam slots 80, 81, the locking portion 56b is passed through one of the locking holes 65, 66, 67, 68 of the upper bracket 50 and the through-hole 75 of the lower bracket 51 so as to lock the upper bracket 50 and the lower bracket 51. In this case, the other end of the locking pin 56 is provided with a chamfer A. The locking portion 56b is passed through the locking holes 65, 66, 67, 68 and the through-hole 75 more easily by virtue of the chamfer A.

Figure 19B:
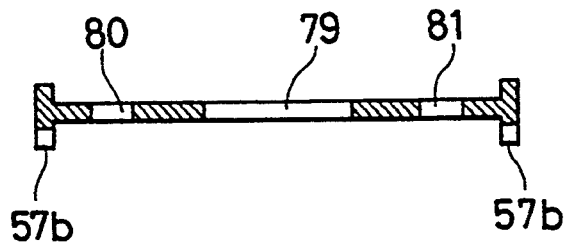

As illustrated in FIG. 19, the cam plate 57 is formed substantially as a flat plate having a centrally provided comparatively large hole 79 extending in the longitudinal direction. In cam plate 57 as it appears in FIG. 19, the upper edge is formed to have the pair of cam slots 80, 81, which diverge from each other from the top down, into which the cam follower 56a of the locking pin 56 is inserted. The lower end of the cam plate 57 is provided with a hole 82 to which one end of the operating-force transmitting link 59 is connected, and with a hole 83 to which one end of the biasing spring 97 (shown in FIG. 2), which biases the cam plate 57 upward at all times as seen in FIG. 19, is connected. The left and right side edges and the upper edge of the cam plate 57 are formed to have a flange 57a. In particular, the flange portions of flange 57a that are formed on the right and left side edges of the cam plate 57 serve as guide portions 57b which come into abutting contact with a guiding surface 58d (shown in FIG. 20) of the case 58 so as to guide the cam plate 57 along this guiding surface.

Figure 20B:
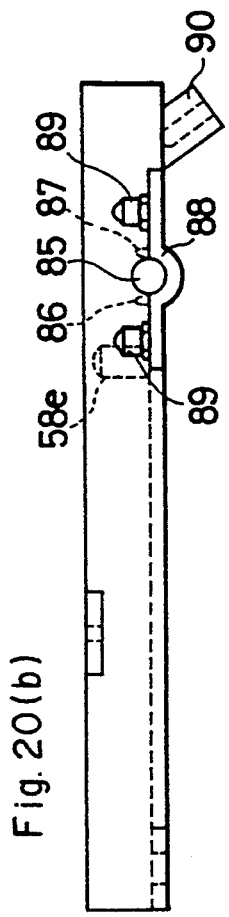
FIG. 20 illustrates the case of the seat-back tilting control device, in which (a) is a plan view thereof, (b) a plan view and (c) a side view.
Figure 20A:
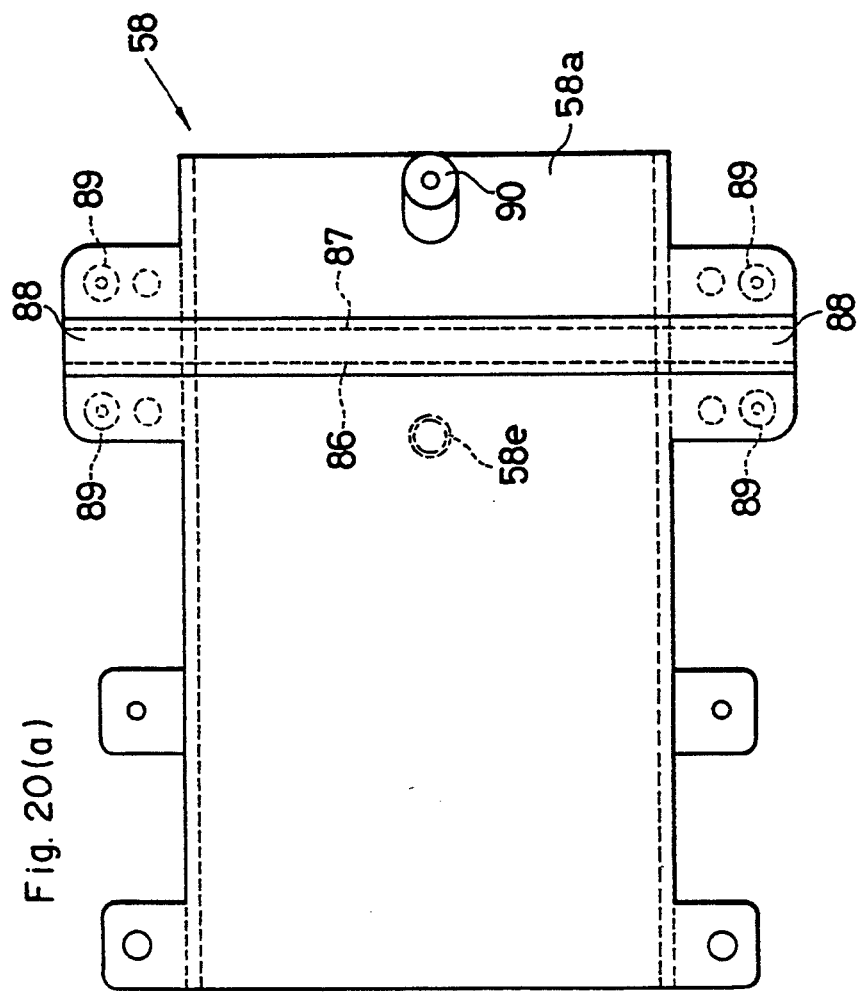
Figure 20C:
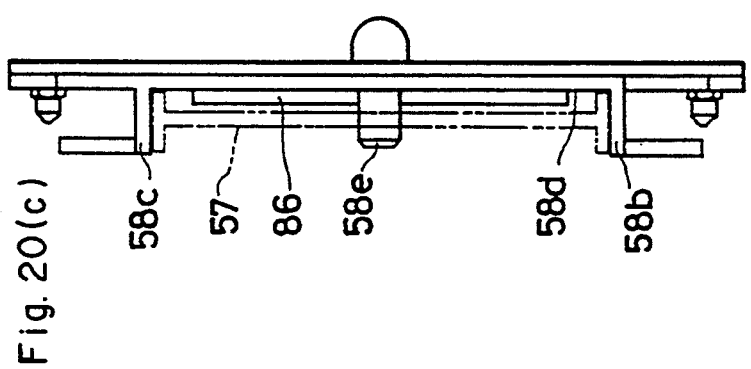

As illustrated in (a) through (c) in FIG. 20, the case 58 is formed as a flat plate and has a main body 58a one side surface of which is provided with a pair of parallel upstanding side walls 58b, 58c extending in the longitudinal direction. As indicated by the phantom lines in (c) of FIG. 20, the cam plate 57 is disposed so as to be movable in the longitudinal direction of the case within a space delimited by the main body 58a and the two side walls 58b, 58c In this case, the cam plate 57 moves while being guided along the guiding surface 58d of the main body 58a owing the fact that the guide portions 57b abut against the guiding surface 58d, and while being guided along the two side walls 58, 58c. Further, the one side surface of the main body 58a is provided with an upstanding projection 58e that mates with a projection 91 (shown in FIG. 21) on the pin cover 84.

The two side walls 58b, 58c are each provided with a locking-pin through-hole 85 through which the locking pin 56 is capable of being inserted. A pair of guides 86, 87 which guide the locking pin 56 are provided in an upstanding attitude, so as to correspond to the locking-pin through-holes 85, between the two side walls 58b, 58c on the one side face of the main body 58a. Guiding supports 88 for the locking pin 56, which supports have a semicircular recess the diameter of which is the same as that of the locking-pin through-hole 85, are provided on the outer side of the side walls 58b, 58c of the main body 58a. Mounting portions 89 to which the pin cover 84 is attached are provided on both sides of each of the guiding supports 88. Further, the other side surface of the main body 58a is provided with a mounting portion 90 for mounting the case 58 on the seat-portion body 7.

As illustrated in FIG. 21, the pin cover 84 is provided at the center of its main body 84a with the upstanding projection 91 formed to have a circular hole 92. The circular hole 92 mates with the projection 58e of the case 58, as mentioned above, whereby the case 58 and the pin cover 84 are positioned. The main body 84a is provided with a pair of guide slots 93, 94 in each of which is inserted the tip of the cam follower 56a of the locking pin 56 passed through the cam slots 80, 81. The cam follower 56a is capable of moving along the guide slots 93, 94 .

Further, the left and right edges of the main body 84 are provided with guiding supports 95 for the locking pin 56, which supports have a semicircular recess the diameter of which is the same as that of the locking-pin through-holes 85. The recess of each guiding support 95 cooperates with the recess of the guiding support 88 in the case 58 so as to form a locking-pin through-hole the diameter of which is equal to that of the locking-pin through-hole 85 of case 58.

Accordingly, the locking pin 56 is guided by the guide slots 93, 94, the pair of guides 86, 87, the locking-pin through-hole 85 and the locking-pin through-hole formed by the recess of the guiding support 95 and the recess of the guiding support 88. As a result, movement of the locking pin 56 is reliable and smooth.

Mounting portions 96 are provided on both sides of each guiding support 95. By attaching the mounting portions 96 to the mounting portions 89 of the case 58, the pin cover 84 is attached to the case 58.

With the cam plate 57 and pin cover 84 installed in the case 58, the biasing spring 97 is compressed between the projection 92 of the pin cover 84 and the hole 83 of the cam plate 57, as depicted in FIG. 2. The biasing spring 97 constantly urges the cam plate 57 upward and diagonally to the left in FIG. 2 with respect to the case 58. Accordingly, in the ordinary state, the locking pin 56 is situated at the lowermost end of the diverging cam holes 80, 81 in FIG. 19(a).

As illustrated in FIG. 2, the operating-force transmitting link 59 has one end thereof connected to the hole 55e of the connecting portion 55d of operating lever 55. The other end of the link 59 is connected to the hole 82 of the cam plate 57. The operating-force transmitting lever 59 is capable of being formed from a conventional common force-transmitting link, such as a rod, an inner cable, an outer cable or a combination thereof, and an appropriate location along the link 59 is supported on the seat-portion body 7.

In the seat-back tilting control device 4 thus constructed, the cam follower 56a of the locking pin 56 ordinarily is set at the lowermost end of the cam slots 80, 81 by the biasing spring 97, as described above, and the locking pin 56 is projecting to the maximum degree. With the locking pin 56 in this state, as shown in FIG. 22, the locking portion 56b is fitted into any one of the locking holes 65, 66, 67, 68 and the through-hole 75. The locking pin 56 therefore is in the locking position. As a result, the seat back 3 is set at a prescribed reclining angle or in the folded position. When the cam plate 57 is moved downward in FIG. 22 by pulling the operating lever 55 forward, the cam follower 56a is guided by the cam slot 80, and therefore the locking pin 56 moves to the right. When the cam follower 56a is situated at the uppermost end of the cam slot 80, as indicated by the phantom lines, the locking portion 56b exits completely from one of the locking holes 65, 66, 67, 68 and from the through-hole 75, whereby the locking pin 56 assumes the unlocking position. As a result, the seat back 3 is free to tilt. Thus, in the present embodiment, the seat-back tilting control device 4 functions as both reclined-state locking means for locking the seat back 3 at a predetermined reclining angle and folded-state locking means for locking the seat back 3 in the folded position.

The infant seat belt device 5 includes left and right shoulder belts 5a, a chest-contact pad 5b connected to the shoulder belts 5a, a tongue 5c attached to the lower end of the chest-contact pad 5b, the buckle 5d with which the tongue 5c locks, and a retractor 5e for taking up a webbing, which unites the left and right shoulder belts 5a into a single body, through the back of the seat back 3. The infant seat belt device 5 is substantially identical with that of the prior art.

Figure 23A:
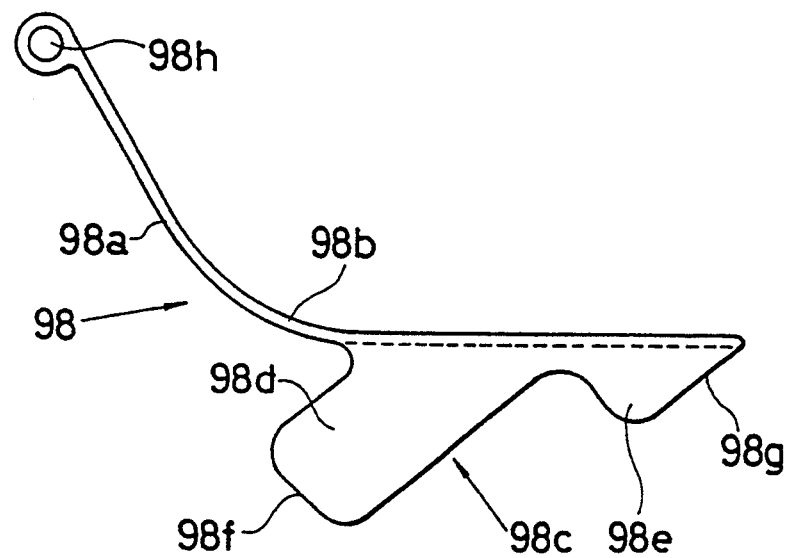
FIG. 23 illustrates a cover seat in this embodiment, in which (a) is a side view thereof and (b) a front view.
Figure 23B:
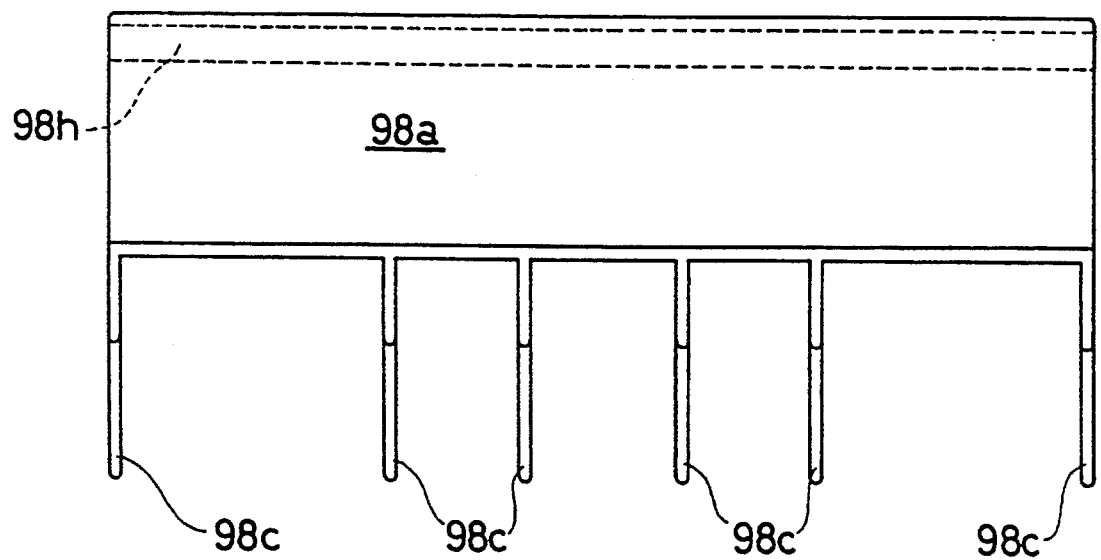

As depicted in FIGS. 1 and 2, a cover seat 98 is supported on the turning shaft 20, which tiltably supports the seat back 3 relative to the seat portion 2, so as to be capable of tilting between the position indicated by the solid line and the position indicated by the phantom line in FIG. 2, the cover seat 98 being situated between the left and right lower brackets 51. As illustrated in FIG. 23, the cover seat 98 has a curving main body 98a the upper surface of which defines a seat surface 98b for seating an infant. The lower surface of the main body 98a is provided with a predetermined number of ribs 98c. The ribs 98c, which are formed to be identical in shape, have a rectangular first projection 98d and a triangular second projection 98e. The upper end of the cover seat 98 is provided with a hole 98h into which the turning shaft is loosely fitted.

The cover seat 98 is formed in such a manner that when it is at the position indicated by the solid line in FIG. 2, it will cover the second recess of the seat-portion body 7 and cooperate with the seat surface 7a at the forward part of the seat-portion body 7 and a seat-back surface 31a of the seat back portion 31, which constitutes the seat back 3, to render continuous the seat surface of the protective seat 1 and the surface of the seat back. As a result, the infant can be seated safely and reliably. In this case, as illustrated in FIG. 2, a tip 98f of the first projection 98d comes into abutting contact with one inclined surface of the V-shaped second recess 14, and an oblique end 98g of the second projection 98e comes into abutting contact with the other inclined surface of the second recess 14. As a result, the weight of the seated infant is reliably supported on the seat-portion body 7 via the ribs 98c.

Figure 24:
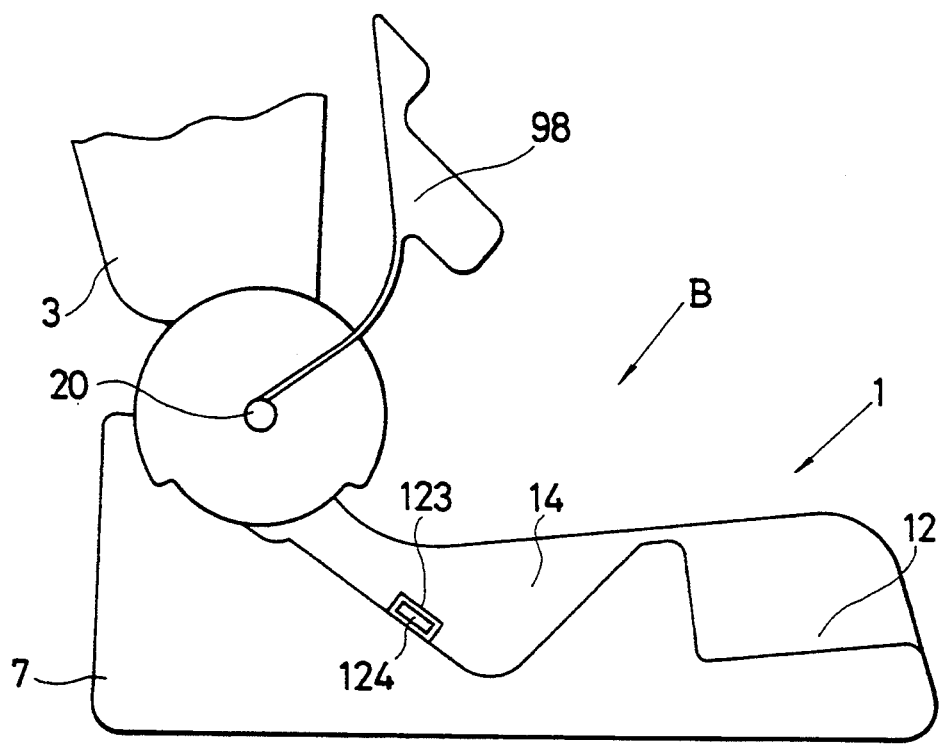
FIG. 24 is a view for describing the action of the cover seat.

When the cover seat 98 is at the position indicated by the phantom line in FIG. 2, on the other hand, it opens the second recess 14 of the seat-portion body 7. As a result, when the protective seat 1 is attached to and detached from a vehicle seat, as shown in FIG. 24, the operation for fastening and unfastening of the tongue 123 and buckle 124 of the seat belt device, which is installed at the vehicle seat and situated in the second recess 14, can be performed easily from above the front of the protective seat 1 (i.e., from the direction of arrow B). In particular, when it is difficult to secure the protective seat 1 to the vehicle seat from the sides of the vehicle seat whose width is only slightly larger than the width of the protective seat 1, as in a vehicle seat both sides of which have wings or arm rests, the operation for attaching and detaching the protective seat is greatly simplified.

As illustrated in FIGS. 1 and 2, the shoulder-belt adjusting device 6 includes the belt guide 101 for guiding the shoulder belts of the infant seat belt in such a manner that the position of the shoulder belts can be adjusted up or down, the supporting means 102 for supporting the belt guide 101, the vertically extending screw shaft 103 for moving the supporting means 102 up and down, the operating knob 104 turnably attached to one of the left and right side walls 32, 33 (the left side wall 33 in the example illustrated) of the seat back 3, and the torque link 105 which connects the operating knob 104 and the screw shaft 103 while producing a right-angle change in direction, and which transmits the rotational torque of the operating knob 104 to the screw shaft 103. The torque link 105 is capable of being formed of a resilient torque link used generally in the prior art.

Figure 25A:
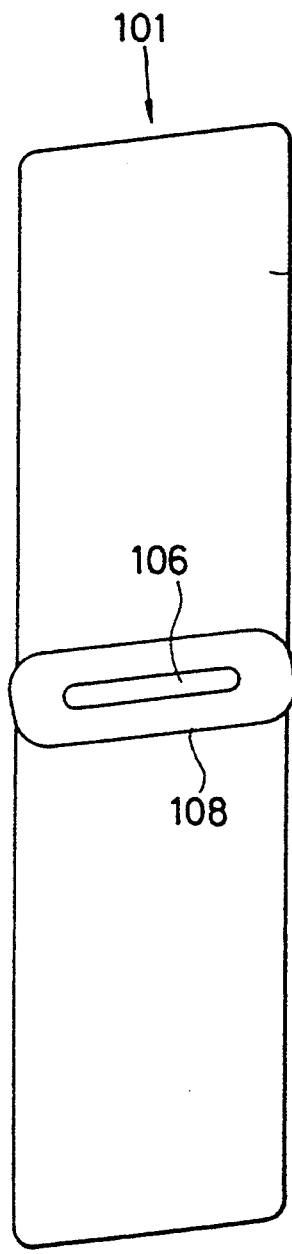
FIG. 25 illustrates a belt guide in a shoulder-belt adjusting device of this embodiment, in which (a) is a front view, (b) a sectional view taken along line XVB—XVB in (a), and (c) a back view.
Figure 25B:
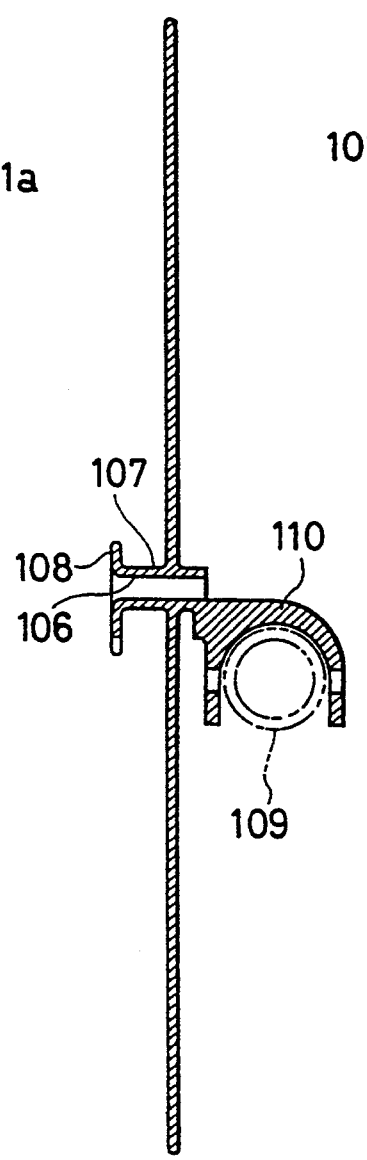
Figure 25C:
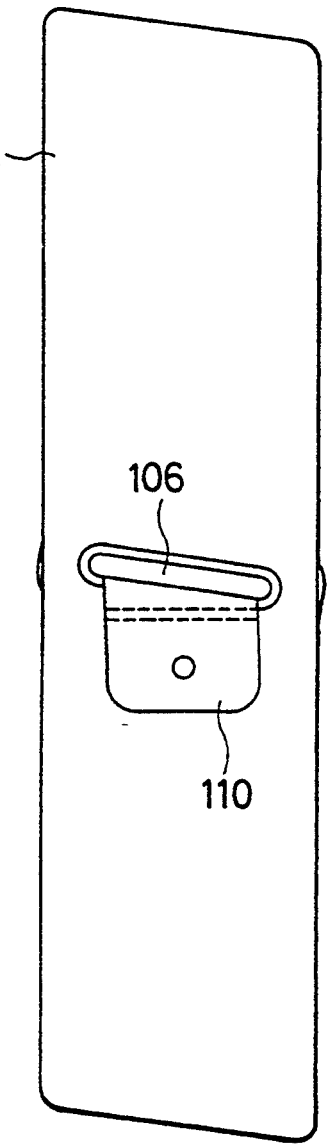

As depicted in FIG. 25, the belt guide 101 has a main body 101a comprising an elongated flat plate having the shape of a parallelogram. The main body 101a has a slot 106, which is provided substantially at the middle thereof, through which the shoulder belt of the infant seat belt is slidably passed, and is integrally formed to have a cylindrical portion 107 extending from one side of the main body 101 to the other side thereof. Furthermore, one end of the cylindrical portion 103 is formed to have a flange 104. The other end of the cylindrical portion 107 is provided with a grip portion 110 which grips a cylindrical member 109 of the supporting means 102.

As indicated by the phantom line in FIG. 3, the seat cover 111 is attached to the seat back 3 via a cushion 112. The seat cover 111 and the cushion 112 are formed to have holes of the same shape as the guide slots 34, 35 at positions corresponding to the guide slots 34, 35 of the seat back 3. The cylindrical portion 107 between the main body 101a and the flange 108 slidably penetrates these holes in the cover 111 and cushion 112. Accordingly, the cover 111 and the cushion 112 are situated between the main body 101a and the flange 108.

The main body 101a on the side of the grip portion 110 is in abutting contact with the seat back 31 of the seat back, as shown in FIG. 3, and the belt guide 101 is capable of sliding along the main body 101a. Further, the cylindrical portion 107 between the main body 101a and the grip portion 110 is passed through the guide slots 34, 35 and is capable of sliding while being guided by the guide slots 34, 35. Accordingly, the belt guide 101 is capable of moving between an upper-limit position (the position at which the slot 106 is indicated by the solid line) C at which the cylindrical portion 107 abuts against the upper end of the guide slots 34, 35, and a lower-limit position (the position at which the slot 106 is indicated by the phantom line) D at which the cylindrical portion 107 abuts against the lower end of the guide slots 34, 35.

In this case, the main body 101a is designed to have such a size that the guide slots 34, 35 and the holes in the cover 111 and cushion 112 can be closed even when the cylindrical portion 107 of the belt guide 101 is situated at a position between the upper-limit position and the lower-limit position. The external shape of the flange 108 is formed to be larger than that of the guide slots 34, 35, and therefore the cover 111 and cushion 112 may be easily detached from between the flange 108 and main body 101a.

Figure 26:
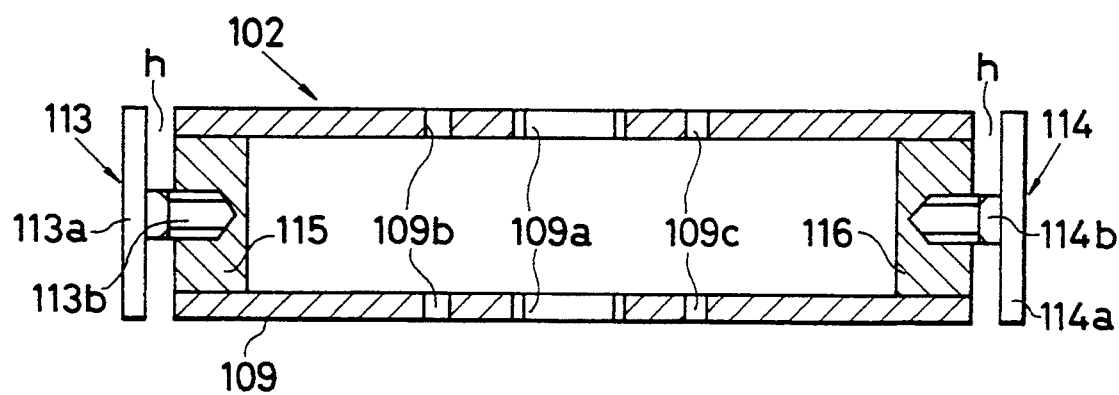
FIG. 26 is a front view showing supporting means of the shoulder-belt adjusting device in this embodiment, with a portion thereof being cut away.

The supporting means 102 includes the cylindrical member 109 and guides 113, 114 fixedly secured to the left and right ends of the cylindrical member 109, as illustrated in FIG. 26. The central part of the cylindrical member 109 is formed to have female threads that are threadedly engaged by the screw shaft 103, and holes 109b, 109c, through which bolts for securing the grip portion 110 of the belt guide 101 are passed, are provided in the cylindrical member on both sides of the female threads 109a. The guides 113, 114 respectively comprise disk-shaped guide portions 113a, 114a and screw portions 113b, 114b upstanding from the centers of the guides. The guides 113, 114 are screwed respectively into closing members 115, 116 secured in the two ends of the cylindrical member 109 so as to form prescribed gaps h, whereby the guides 113, 114 are fixed to the cylindrical member 109.

The screw portions 113b, 114b of the respective guides 113, 114 are passed through the guide slots 69 of the upper brackets 50 secured to the left and right side walls of the seat back 3, and the upper brackets 50 are situated in the gaps h so that the supporting means 102 is attached so as to be movable up and down while being guided by the guide slot 69. A laterally directed force, a longitudinally directed force and moments about these directions acting upon the cylindrical portion 109 are supported by the upper brackets 50.

As shown in FIGS. 1 and 2, the screw shaft 103 is threadedly engaged with the female threads 109a of the cylindrical member 109, and the upper and lower ends of the screw shaft 103 are supported respectively by the brackets 36, 37 of the seat back 3. With regard to the bracket 36 on the upper side in this case, the upper end of the screw shaft 103 is supported so as to be capable solely of rotation in the free state in the thrust direction. With regard to the bracket on the lower side, the lower end of the screw shaft 103 is supported so as to be capable of rotation in the supported state in the thrust direction. Accordingly, the up-and-down force which acts upon the cylindrical member 109 is supported by the bracket 37 on the lower side via the screw shaft 103 and is not supported by the bracket 36 on the upper side. As a result, though it is necessary for the bracket 37 on the lower side to be made comparatively large for reasons of strength, it will suffice if the bracket 36 on the upper side is comparatively small. This means that although the seat back 3 is tilted back when the protective seat 1 is in use, as shown in FIG. 2, the amount of projection of the protective seat 1 to the rear is small owing to the fact that the upper bracket 36 is small. Accordingly, when the protective seat is secured to the seat of the vehicle, the seat 1 is prevented from being secured too far forward relative to the vehicle seat. By virtue of this feature, the body of the infant can be kept a greater distance away from the parts of the vehicle in front of the seat, and the protective seat 1 can be secured to the vehicle seat more stably and reliably.

As shown in FIG. 1, one end of the torque link 105 is connected to the lower end of the screw shaft 103 in such a manner that it is incapable of rotating relative to the screw shaft 103. The torque link 105 is bent at right angles from the vertical direction and extends to the left, and the other end thereof is rotatably supported on the bracket 44 secured to the seat back 3. This end of the torque link 105 serves as a connecting portion 105a formed to have an angular cross section. The connecting portion 105a is directed leftward in reliable fashion by the bracket 44.

The operating knob 104 is turnably attached to the left side wall 32 of the seat back 3 at a position opposing the connecting portion 105a of the torque link 105. In this case, the operating knob 104 is capable of being attached and detached to and from the left side wall 32 by a force greater than a prescribed value. The end portion of the turning shaft 104a of the operating knob 104 is provided with a hole 104b the sectional shape of which is similar to but somewhat larger than the sectional shape of the connecting portion 105a of torque link 105. Accordingly, when the operating knob 104 is inserted into and attached to the left side wall 32, the connecting portion 105a is fitted into the hole 104b, as a result of which the turning shaft 104a and connecting portion 105a are connected to make only rotation impossible. In this case, the turning shaft 104a is guided by a guide 118, and therefore the turning shaft 104a and connecting portion 105a are capable of being connected easily and reliably.

As shown in FIG. 1, the supporting means 102, screw shaft 103 and torque link 105 are covered by the cover 126.

In the case of this embodiment, the operating knob 104 is disposed on the left side wall 32. By adopting this arrangement, the amount of rearward projection of the seat back 3 is reduced in comparison with a case in which the operating knob 32 is provided on the upper portion of the seat back 3. Accordingly, when the infant-restraining protective seat 1 is secured to a vehicle seat, the protective seat 1 is prevented from being secured too far forward relative to the vehicle seat, just as described above. Though the operating knob 104 is disposed on the left side wall 32 in this embodiment, the operating knob 104 can be disposed on the right side wall 33 if desired.

When the operating knob 104 is turned in the shoulder-belt adjusting device 6 thus constructed, the rotational torque is transmitted to the screw shaft 103 via the torque link 105, whereby the screw shaft 103 is turned. Turning the screw shaft 103 in one direction lowers the belt guide 101, whereas turning the screw shaft 103 in the other direction raises the belt guide 101. Thus, the position of the shoulder belts of the infant seat belt device can be continuously adjusted up and down.

Figure 27:
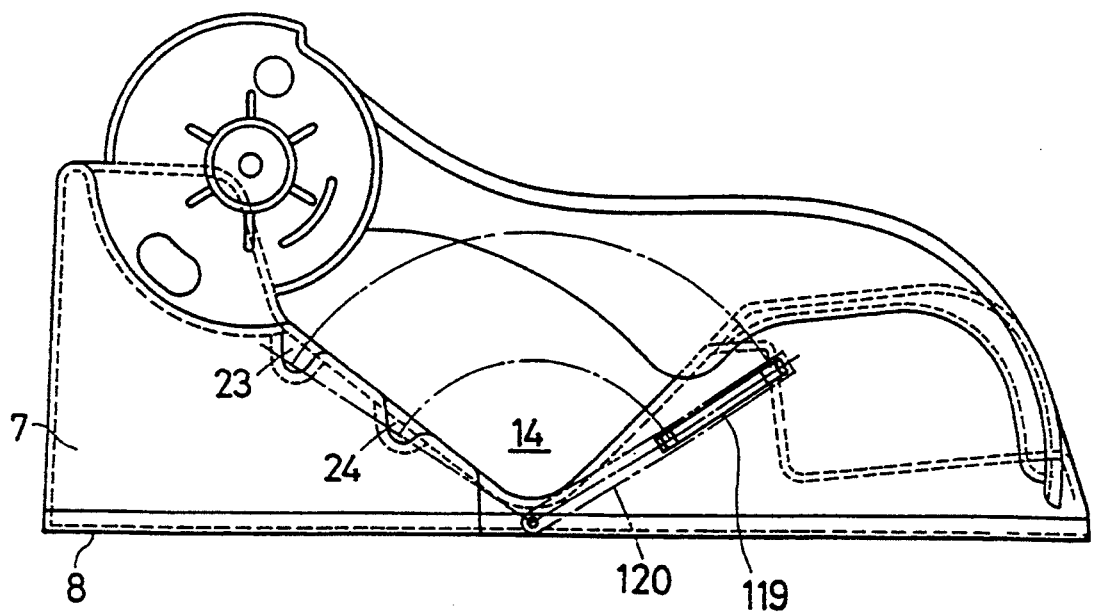
FIG. 27 is a view showing the set position of a belt guide as well as the mounting position of a retaining spring for retaining the belt guide in this embodiment.
Figure 29A:
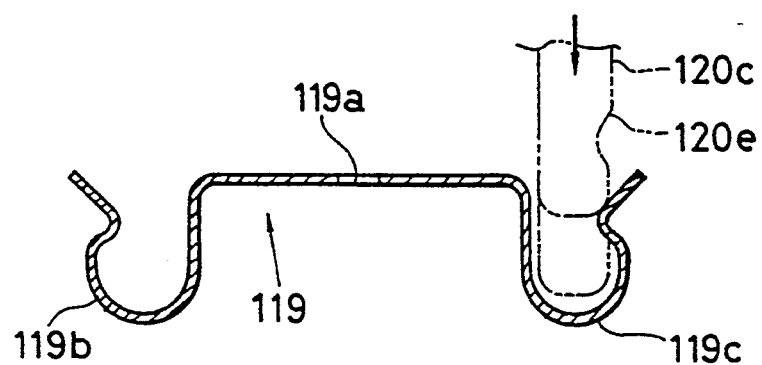
FIG. 29 illustrates the retaining spring of this embodiment, in which (a) is a front view thereof and (b) a plan view.
Figure 29B:
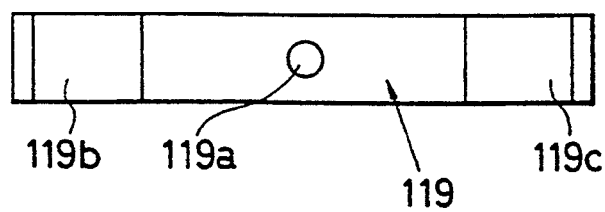
Figure 28:
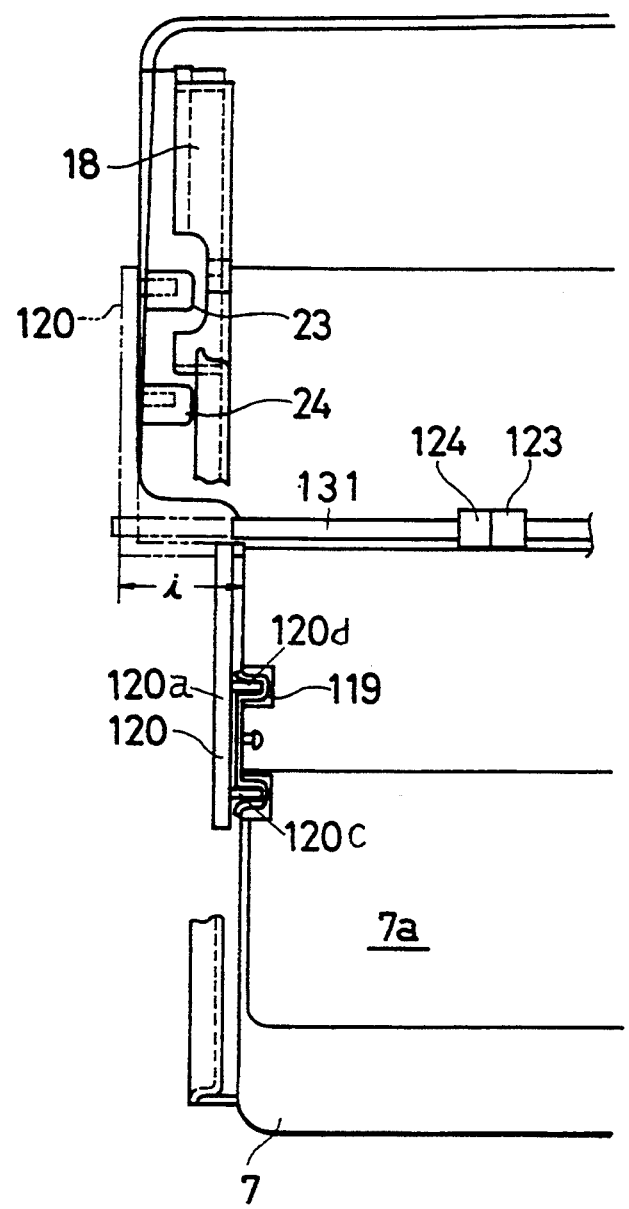
FIG. 28 is a view for describing the operation of the belt guide.

As illustrated in FIGS. 27 and 28, a retaining spring 119 is fixedly secured to at least one of the left and right side walls (the left side wall in the illustrated embodiment) of the seat-portion body 7 for the purpose of retaining the belt guide (the details of which will be described later) in the vicinity of the other inclined surface of the second recess 14. As depicted in FIG. 29, the retaining spring 119 comprises a resilient member the center of which is provided with a mounting hole 119a. The left and right ends of the spring 119 are provided with retaining portions 119b, 119c which resiliently retain the two projecting portions of the belt guide.

Figure 30:
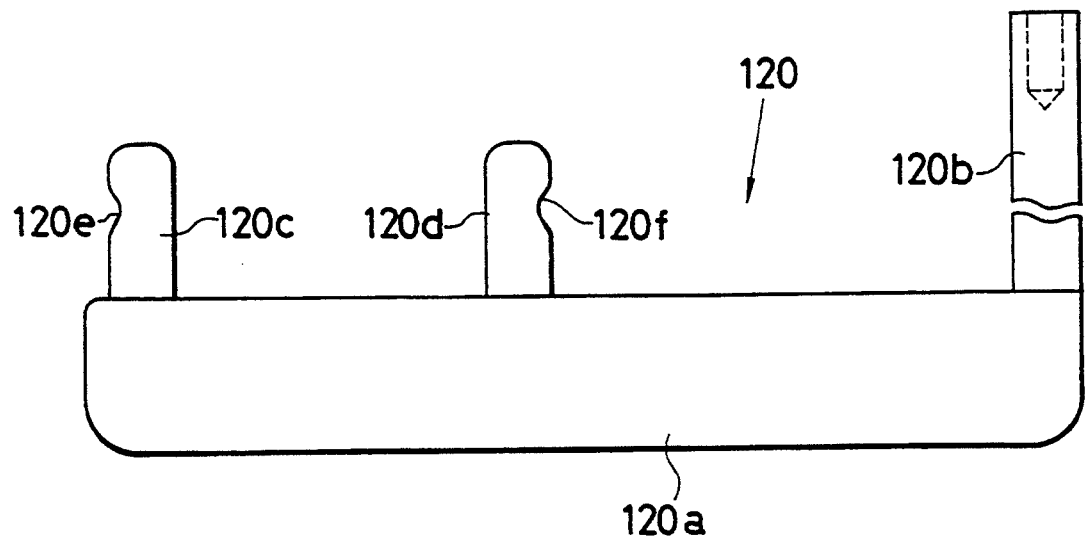
FIG. 30 is a view showing the belt guide of this embodiment.

The belt guide 120 is supported on the base portion 8 at a position corresponding to the lowermost part of the second recess 14 so as to be capable of turning and of moving to the left and right. As illustrated in FIG. 30, the belt guide 120 comprises a guide portion 120a for guiding the seat belt of the vehicle, a turning shaft 120b provided on one end of the guide portion 120a and passed through belt-guide through-holes 29, 30 (shown in FIG. 8) of the base portion 8 so as to be capable of turning and of moving axially, and two projecting portions 120c, 120d upstanding from the guide portion 120a. The two projecting portions 120c, 120d are formed respectively to have recesses 120e, 120f engaged by the respective retaining portions 119b, 119c of the retaining spring 119.

Figure 31:
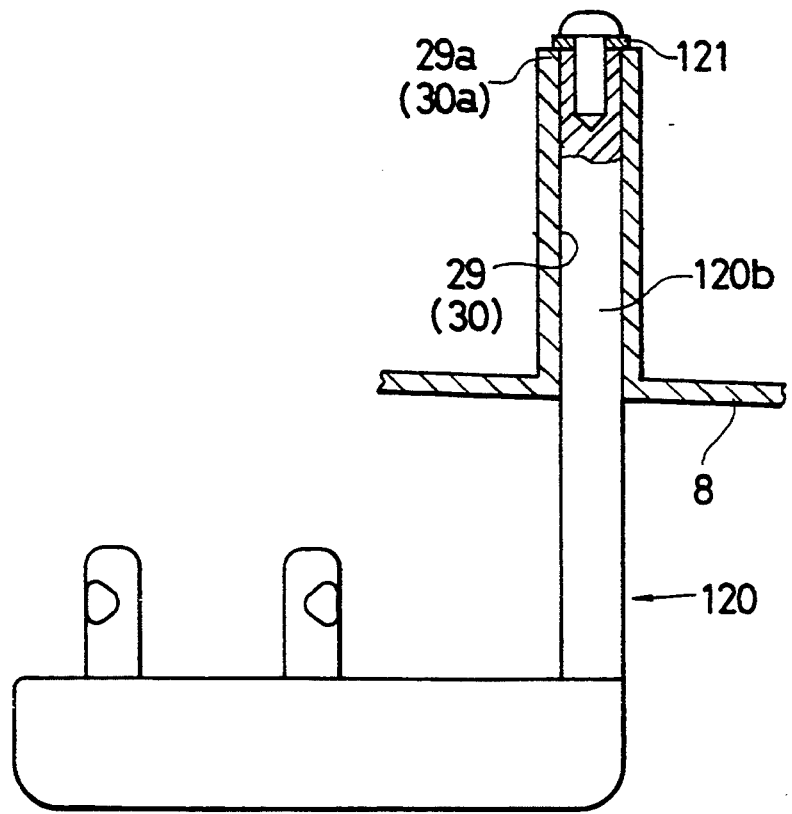
FIG. 31 is a view showing the belt guide in the mounted state.

As indicated by the solid line in FIG. 28, the belt guide 120 ordinarily is set in a state in which it is not used, namely in a state in which it is pushed into the base portion 8 to the maximum extent and retained by the retaining spring 119. For example, in a case where the width of the vehicle seat is fairly large relative to the width of the protective seat 1, the belt guide 120 is pulled out the prescribed amount and turned leftward, as indicated by the two-dot chain line, and the belt guide 120 is set at a position where the projecting portions 120c, 120d fit into the respective grooves 23, 24. With the belt guide 120 in this position, the seat belt of the vehicle is guided from the left by an amount i. Furthermore, as shown in FIG. 31, pull-out of the belt guide 120 is limited owing to the fact that an engaging member 121 secured to the end of the turning shaft 120b comes into abutting contact with a stopper 29a provided at the end portions of the belt-guide through-holes 29, 30.

Figure 32A:
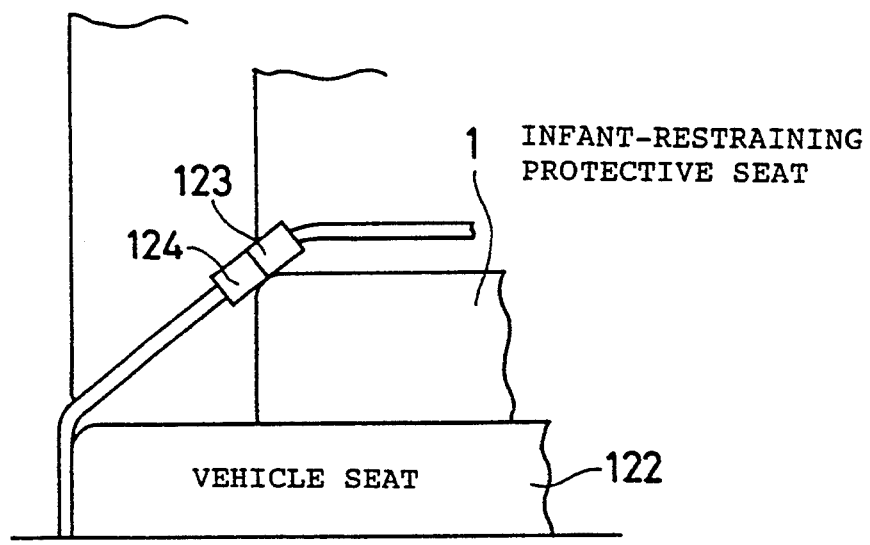
FIG. 32 is for describing the belt guide, in which (a) is an explanatory view for a case where there is no belt guide and (b) an explanatory view for a case where there is a belt guide.
Figure 32B:
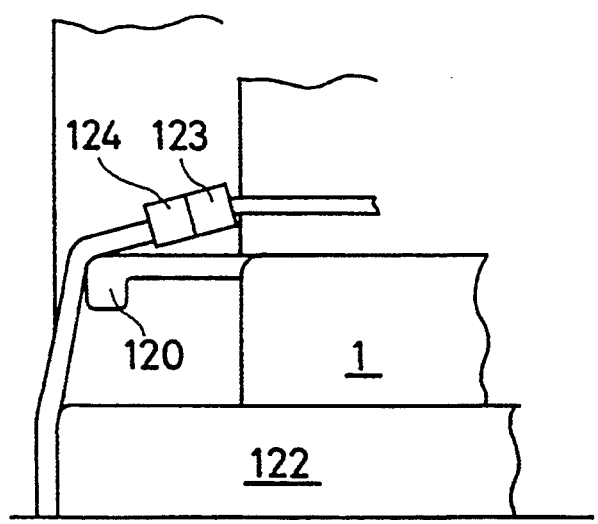

The reason for providing the belt guide 120 is as follows: In some vehicles, particularly those in which the width of the vehicle seat is fairly large in comparison with the width of the protective seat 1, there will be instances in which the portion where the tongue of the vehicle seat belt device and the buckle thereof engage happens to be situated at the corner of the protective seat 1 when the tongue and buckle are fastened together, as shown in (a) of FIG. 32, after the protective seat 1 has been secured to the vehicle seat. When the tongue and buckle are joined in such a state, the connection between the two is unstable. However, when the belt guide 120 is pulled out to the left and the seat belt is guided by the guide 120, as shown in (b) of FIG. 32, the portion where the tongue and buckle engage is kept away from the corner of the protective seat, thereby stabilizing the engagement between the tongue and buckle and greatly improving its reliability.

In accordance with the infant-restraining protective seat according to the present invention, as evident from the foregoing description, the seat portion for seating the infant and the seat back for supporting the back of the seated infant are capable of being folded. When the infant-restraining protective seat is not in use, the protective seat can be reduced in size by folding the seat portion and the seat back. Accordingly, the protective seat can be carried about and set up on the seat of a vehicle much more easily. In addition, only a small amount of space is necessary for storage.

Further, in accordance with the present invention, at least part of the seat portion is capable of being received between the left and right side walls of the seat back when the seat portion and seat back are folded. When folded, therefore, the protective seat has a more compact configuration.

Further, in accordance with the present invention, the seat back is locked in the folded position when the seat portion and the seat back are folded. As a result, handling of the protective seat is made very simple.

Further, in accordance with the present invention, the seat back can be set at a prescribed reclining position relative to the seat portion so that the infant can be seated in a relaxed and comfortable condition.

Further, in accordance with the present invention, the reclined-state locking means functions also as the folded-state locking means, and therefore folded-state locking means need not be provided separately. Accordingly, the number of component parts is reduced and construction is simplified.

As many apparently widely different embodiments of the present invention can be made without departing from the spirit and scope thereof, it is to be understood that the invention is not limited to the specific embodiments thereof except as defined in the appended claims.

What is claimed is:

1. An infant-restraining protective seat, comprising:
    a seat portion (2) for seating an infant on an upper surface of the seat portion, said seat portion having a front end and a rear end and having a left side and a right side;
    a seat back (3) for supporting the back of the seated infant against a front surface of the seat back, said seat back having an upper end and a lower end and having a left side (32) and a right side (33);
    infant restraining means (5) for restraining and protecting the seated infant;
    said lower end of said seat back being tiltably attached to said rear end of said seat portion in such a manner that said front surface of said seat back is foldable towards said upper surface of said seat portion from a reclined-state position to a folded-state position;
    wherein said seat back left and right sides are respectively provided with left and right side walls (32, 33), the distance between inner side faces of said left and right side walls being set in such a manner that at least part of said seat portion will be received between said left and right side walls when said seat portion and seat back are folded to said folded-state position; and
    a seat tilting control means (4) for both locking said seat back in said reclined state and for locking said seat back in a folded-state, said control means including a locking pin (56) which is fittable into respective locking holes which correspond to said reclined state and said folded-state, said locking holes being provided on a member (50) which is fixed relative to said seat back.

2. The protective seat according to claim 1, wherein said seat back tilting control means for locking said seat back in said reclined state includes means for locking said seat back to said seat portion at a plurality of reclined states, said reclined-state being one of said plurality of reclined states.

3. The protective seat according to claim 2, wherein said locking pin is insertable into a plurality of locking holes, said locking holes corresponding to a particular one of said plurality of reclined states.

4. The protective seat according to claim 1, wherein said seat back tilting control means includes an operating lever (55) located proximate said front end of said seat portion, said operating lever being operatively connected to said locking pin.

5. The protective seat according to claim 4, wherein said operating lever is operatively connected to said locking pin (56) via a cam (56a80, 81), and said cam (56a, 80, 81) comprising a cam follower (56a) connected to said locking pin (56), and cam slots (80, 81) for guiding said cam follower.

6. The protective seat according to claim 1, wherein when in said folded-state said left and right sides proximate said rear end of said seat portion are situated in a space (E) formed by narrower portions of said left and right side walls proximate said lower end of said seat back.

* * * * *